US011817731B2

(12) United States Patent
Zeiler et al.

(10) Patent No.: US 11,817,731 B2
(45) Date of Patent: Nov. 14, 2023

(54) BATTERY ASSEMBLY FOR BATTERY POWERED EQUIPMENT

(71) Applicant: Briggs & Stratton, LLC, Wauwatosa, WI (US)

(72) Inventors: Jeffrey Zeiler, Wauwatosa, WI (US); Christopher Krajewski, West Allis, WI (US); Kyle Harvey, Wauwatosa, WI (US); Ryan S. Jaskowiak, Mukwonago, WI (US); Nicholas Zeidler, Wauwatosa, WI (US); Mark Noller, Wauwatosa, WI (US); Todd Johnson, Wauwatosa, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 128 days.

(21) Appl. No.: 17/284,045

(22) PCT Filed: Oct. 11, 2019

(86) PCT No.: PCT/US2019/055785
§ 371 (c)(1),
(2) Date: Apr. 9, 2021

(87) PCT Pub. No.: WO2020/077176
PCT Pub. Date: Apr. 16, 2020

(65) Prior Publication Data
US 2021/0384746 A1   Dec. 9, 2021

Related U.S. Application Data

(60) Provisional application No. 62/744,697, filed on Oct. 12, 2018.

(51) Int. Cl.
*H02J 7/00* (2006.01)
*H01M 50/244* (2021.01)
(Continued)

(52) U.S. Cl.
CPC ......... *H02J 7/0045* (2013.01); *H01M 10/425* (2013.01); *H01M 10/46* (2013.01);
(Continued)

(58) Field of Classification Search
CPC .... H02J 7/0045; H02J 7/00036; H02J 7/0013; H02J 7/0048; H01M 10/425;
(Continued)

(56) References Cited

U.S. PATENT DOCUMENTS 5,401,591 A   3/1995  Bishay et al.
6,168,881 B1 * 1/2001  Fischer ............... B25F 5/02
                                                    429/97

(Continued)

FOREIGN PATENT DOCUMENTS

CN        109244304        1/2019
DE     10 2017 123 102     5/2018
(Continued)

*Primary Examiner* — M Baye Diao
(74) *Attorney, Agent, or Firm* — Foley & Lardner LLP

(57) ABSTRACT

A battery assembly includes a housing having a handle, rechargeable battery cells disposed within the housing, and a mating feature configured to selectively connect the battery assembly with a receptacle of at least one of a power equipment and a charging station. The mating feature includes a connector having at least two electrical ports electrically connected to the battery cells, and a data port configured to provide data communication between the battery assembly and at least one of a power equipment and a charging station. The mating feature also protrudes away from a side portion of the housing.

13 Claims, 32 Drawing Sheets

(51) Int. Cl.
*H01M 50/256* (2021.01)
*H01M 50/204* (2021.01)
*H01M 10/42* (2006.01)
*H01M 10/46* (2006.01)
*H01M 10/48* (2006.01)
*B60L 53/80* (2019.01)
*B25F 5/00* (2006.01)

(52) U.S. Cl.
CPC ....... *H01M 10/482* (2013.01); *H01M 50/204* (2021.01); *H01M 50/244* (2021.01); *H01M 50/256* (2021.01); *H02J 7/0013* (2013.01); *H02J 7/00036* (2020.01); *H02J 7/0048* (2020.01); *B25F 5/00* (2013.01); *B60L 53/80* (2019.02); *B60L 2200/40* (2013.01); *H01M 2010/4271* (2013.01); *H01M 2010/4278* (2013.01)

(58) Field of Classification Search
CPC .. H01M 10/46; H01M 10/482; H01M 50/204; H01M 50/244; H01M 50/256; H01M 2010/4271; H01M 2010/4278; H01M 50/249; B25F 5/00; B25F 5/02; B60L 53/80; B60L 2200/40; B60L 2200/44; B60L 2250/10; B60L 2250/16; B60L 50/64; B60L 50/66; B60L 58/12; B60L 58/16; Y02P 90/60; Y02T 10/7072; Y02T 10/70; Y02T 90/16; Y02E 60/10
USPC .......................................................... 320/107
See application file for complete search history.

(56) References Cited

U.S. PATENT DOCUMENTS

| | | | |
|---|---|---|---|
| 7,510,797 B2* | 3/2009 | Aker | H01M 50/253 |
| | | | 429/50 |
| 8,092,932 B2 | 1/2012 | Phillips et al. | |
| 8,415,046 B2* | 4/2013 | Kondo | H01M 50/244 |
| | | | 429/98 |
| 8,653,786 B2 | 2/2014 | Baetica et al. | |
| 8,872,474 B2 | 10/2014 | Scheucher | |
| 9,316,694 B2 | 4/2016 | Campbell et al. | |
| 9,316,964 B2 | 4/2016 | Yamaguchi et al. | |
| 9,385,351 B2 | 7/2016 | Workman et al. | |
| 9,537,336 B2 | 1/2017 | Suzuki et al. | |
| 9,783,076 B2 | 10/2017 | Li | |
| 10,147,979 B2 | 12/2018 | Zeller et al. | |
| 10,211,488 B2 | 2/2019 | Willgert et al. | |
| 10,327,392 B2 | 6/2019 | Conrad et al. | |
| 10,347,954 B2 | 7/2019 | Rief et al. | |
| 10,833,300 B2 | 11/2020 | Verhaag et al. | |
| 10,916,743 B2* | 2/2021 | Pellenc | H01M 50/264 |
| 11,136,956 B2* | 10/2021 | Gilpatrick | F02N 11/0803 |
| 11,165,104 B2 | 11/2021 | Funk et al. | |
| 2007/0236179 A1* | 10/2007 | Roehm | H01M 50/202 |
| | | | 320/115 |
| 2010/0275564 A1 | 11/2010 | Baetica et al. | |
| 2012/0135293 A1 | 5/2012 | Gu et al. | |
| 2014/0154535 A1 | 6/2014 | Olsson et al. | |
| 2015/0122562 A1 | 5/2015 | Miyashiro | |
| 2015/0137758 A1 | 5/2015 | Taga et al. | |
| 2016/0099590 A1* | 4/2016 | Velderman | G07F 7/06 |
| | | | 320/113 |
| 2017/0306916 A1 | 10/2017 | Zeiler et al. | |
| 2019/0058337 A1 | 2/2019 | Wolfram | |
| 2019/0075724 A1 | 3/2019 | Becke et al. | |
| 2020/0154962 A1 | 5/2020 | Fie et al. | |
| 2021/0116911 A1 | 4/2021 | Pjevach | |

FOREIGN PATENT DOCUMENTS

| | | |
|---|---|---|
| DE | 102018103767 A1 * | 8/2018 |
| EP | 1 035 599 A1 | 9/2000 |
| EP | 1925405 A1 * | 5/2008 |
| EP | 2 099 085 | 9/2009 |
| EP | 2424001 A2 * | 2/2012 |
| EP | 3367464 B1 * | 10/2019 |
| JP | 2009-277504 | 11/2009 |
| JP | 2010-212165 | 9/2010 |
| JP | 2016-038983 A | 3/2016 |
| WO | WO-2012/178205 A2 | 12/2012 |
| WO | WO-2013139372 A1 * | 9/2013 |
| WO | WO-2015/134884 A1 | 3/2015 |
| WO | WO-2018/031719 A1 | 2/2018 |
| WO | WO-2018/094792 A1 | 5/2018 |
| WO | WO-2019/213407 A1 | 11/2019 |

* cited by examiner

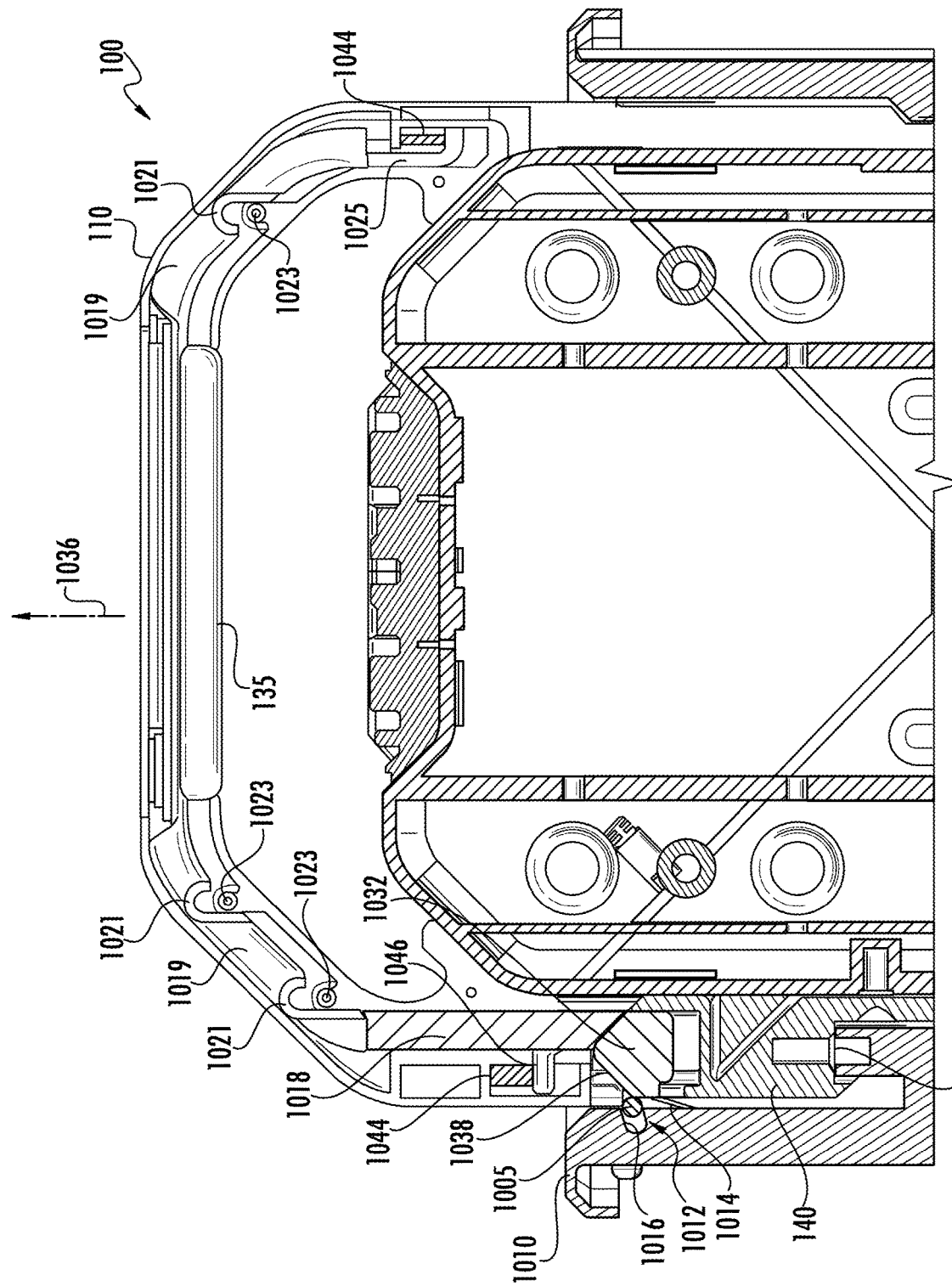

BATTERY ASSEMBLY FOR BATTERY POWERED EQUIPMENT

CROSS-REFERENCE TO RELATED PATENT APPLICATIONS

This application is a National Phase Application of PCT/US2019/055785, filed Oct. 11, 2019 which claims the benefit of U.S. Provisional Application No. 62/744,697, filed Oct. 12, 2018, both of which are incorporated herein by reference in their entireties.

BACKGROUND

The present disclosure generally relates to the field of indoor and outdoor power equipment, and in particular, to the field of battery powered indoor and outdoor power equipment.

SUMMARY

In an embodiment of the disclosure, a battery assembly includes a housing having a handle, rechargeable battery cells disposed within the housing, and a mating feature configured to selectively connect the battery assembly with a receptacle of at least one of a power equipment and a charging station. The mating feature includes a connector having at least two electrical ports electrically connected to the battery cells, and a data port configured to provide data communication between the battery assembly and at least one of a power equipment and a charging station. The mating feature also protrudes away from a side portion of the housing.

In another embodiment of the disclosure, a battery charging system includes a charging rack comprising multiple receptacle, multiple battery assemblies. Each of the battery assemblies includes a housing having a handle, rechargeable battery cells disposed within the housing, and a mating feature protruding away from the housing, wherein the mating feature is configured to selectively connect the battery assembly with the receptacle of the charging rack and includes multiple ports electrically connected to the battery cells and configured receive power from the charging rack to charge the battery cells, and wherein the handle comprises a release button configured to selectively disengage the battery assembly from the receptacle of the charging rack.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, in which:

FIG. 24b is a section view of the battery assembly of FIG. 2.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
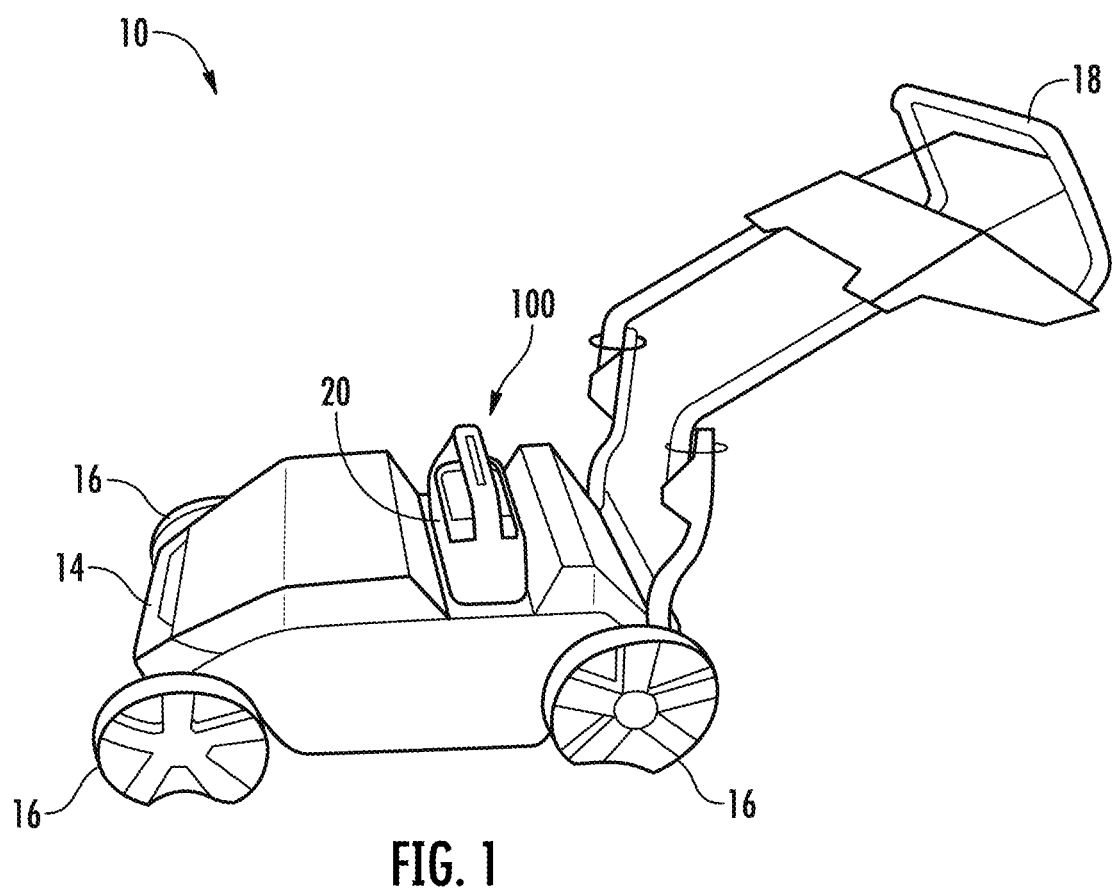
FIG. 1 is a perspective view of a lawn mower, according to an exemplary embodiment.

Referring to FIG. 1, outdoor power equipment, in the form of a lawn mower 10, is shown according to an exemplary embodiment. The lawn mower 10 includes a removable and replaceable battery assembly 100 powering an electric motor (not shown) coupled to a rotary tool, such as the blade in a deck 14 of the lawn mower 10, an auger, a saw, tines, a drill, a pump, or other rotary tools. As shown, the lawn mower 10 further includes wheels 16 and a rearward extending handle 18 designed to be pushed by an operator walking behind the lawn mower 10. The battery assembly 100 described herein also allows electrically powered equipment to be used indoors. The battery assembly 100 can be used with various types of indoor and outdoor power equipment, as well as with portable jobsite equipment. Outdoor power equipment includes lawn mowers, riding tractors, snow throwers, pressure washers, tillers, log splitters, zero-turn radius mowers, walk-behind mowers, riding mowers, stand-on mowers, pavement surface preparation devices, industrial vehicles such as forklifts, utility vehicles, commercial turf equipment such as blowers, vacuums, debris loaders, overseeders, power rakes, aerators, sod cutters, brush mowers, portable generators, etc. Indoor power equipment includes floor sanders, floor buffers and polishers, vacuums, etc. Portable jobsite equipment includes portable light towers, mobile industrial heaters, and portable light stands.

Figure 2:
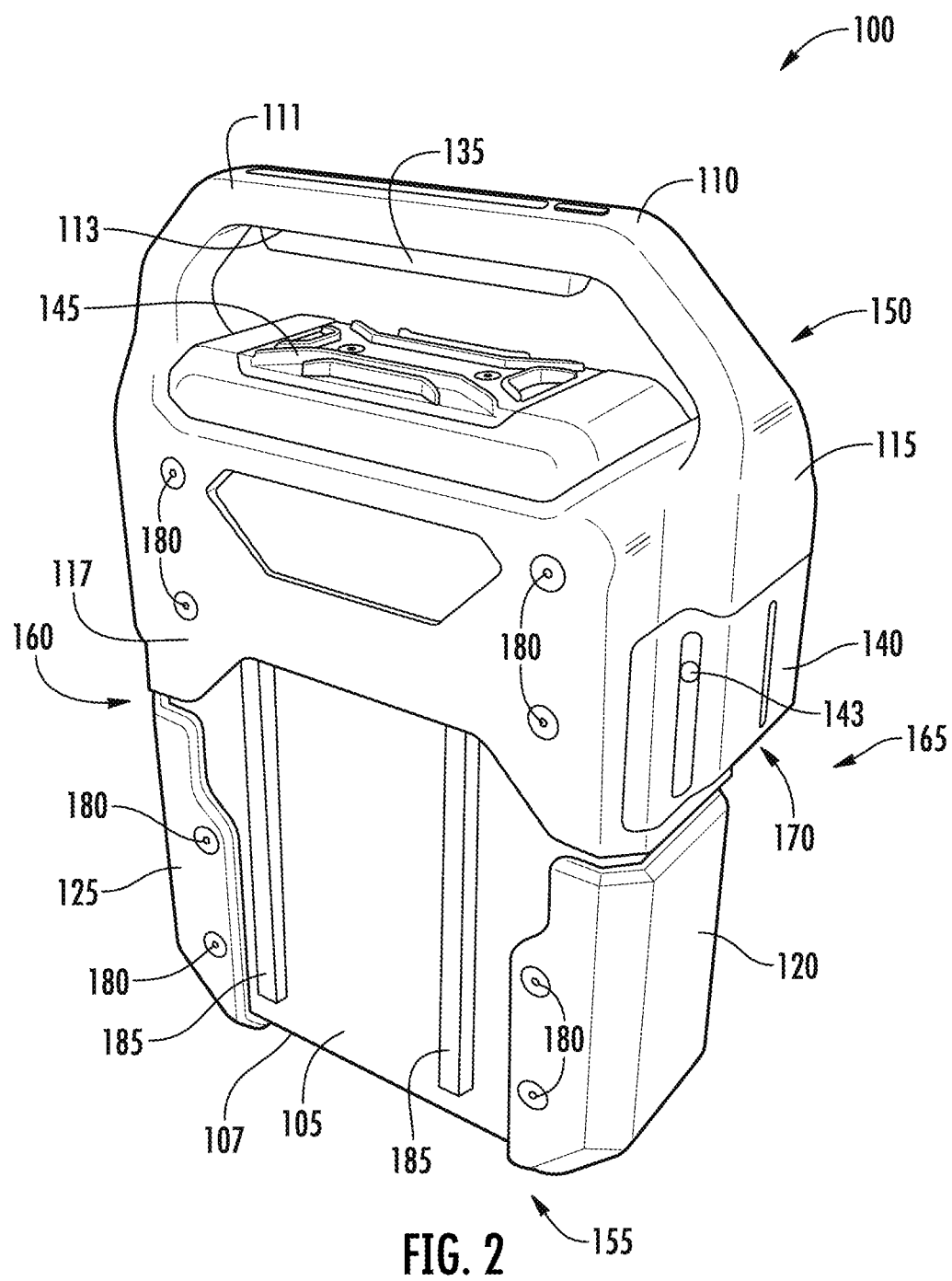
FIG. 2 is a perspective view of a battery assembly for use with various types of indoor and outdoor power equipment, according to an exemplary embodiment.

Referring to FIG. 2, the battery assembly 100 is shown, according to an exemplary embodiment. The battery assembly 100 is removable and rechargeable. The battery assembly 100 is configured to be inserted (e.g., dropped, lowered, placed) into a receiver integrated with a piece of equipment and/or a charging station. The battery assembly 100 can be installed into a piece of equipment vertically, horizontally, and at any angle. The battery assembly 100 includes a battery pack 105 and optionally, one or more modular portions as described below. The battery pack 105 is a Lithium-ion battery. However, other battery types are contemplated, such as nickel-cadmium (NiCD), lead-acid, nickel-metal hydride (NiMH), lithium polymer, etc. The battery assembly 100 yields a voltage of approximately 48 Volts (V) and 1500 Watt-hours (Wh) of energy. It is contemplated that battery assemblies of other sizes may also be used. The battery assembly 100 is also hot-swappable meaning that a drained battery assembly 100 can be exchanged for a new battery assembly 100 without completely powering down connected equipment. As such, downtime between battery assembly 100 exchanges is eliminated.

The battery assembly 100 can be removed by an operator from a piece of equipment without the use of tools and recharged using a charging station, as described further herein. In this way, the operator may use a second rechargeable battery having a sufficient charge to power equipment while allowing the first battery to recharge. In addition, the battery assembly 100 can be used on various types of equipment including indoor, outdoor, and portable jobsite equipment. Due to its uniformity across equipment, the battery assembly 100 can also be used as part of a rental system, where rental companies who traditionally rent out pieces of equipment can also rent the battery assembly 100 to be used on such equipment. An operator can rent a battery assembly 100 to use on various types of equipment the operator may own and/or rent and then return the battery assembly 100 to be used by other operators on an as-needed basis.

Still referring to FIG. 2, the battery pack 105 includes an upper portion 150, a lower portion 155, a left side 160, and a right side 165. The battery assembly 100 further includes an upper modular portion 115 coupled to the upper portion 150 of the battery pack 105, and lower modular portions 120, 125 coupled to a lower portion 155 of the battery pack 105 on each of the left and right sides 160, 165. The upper modular portion 115 and lower modular portions 120, 125 are coupled to the battery pack 105 using fasteners 180 (e.g., bolts, screws). In other embodiments, the modular portions 115, 120, 125 are coupled to the battery pack 105 using a snap fit. The lower modular portions 120, 125 provide protection to the battery pack 105 and act to absorb or limit the amount of force the battery pack 105 endures by dropping, etc. In some embodiments, the battery assembly 100 may not include the upper modular portion 115 and/or lower modular portions 120, 125 and may be permanently mounted to a piece of equipment. The upper modular portion 115 and lower modular portions 120, 125 are exchangeable and customizable such that an operator may chose a different design and/or color based on the type or make and model of the equipment with which the battery assembly 100 is to be used.

Figure 3:
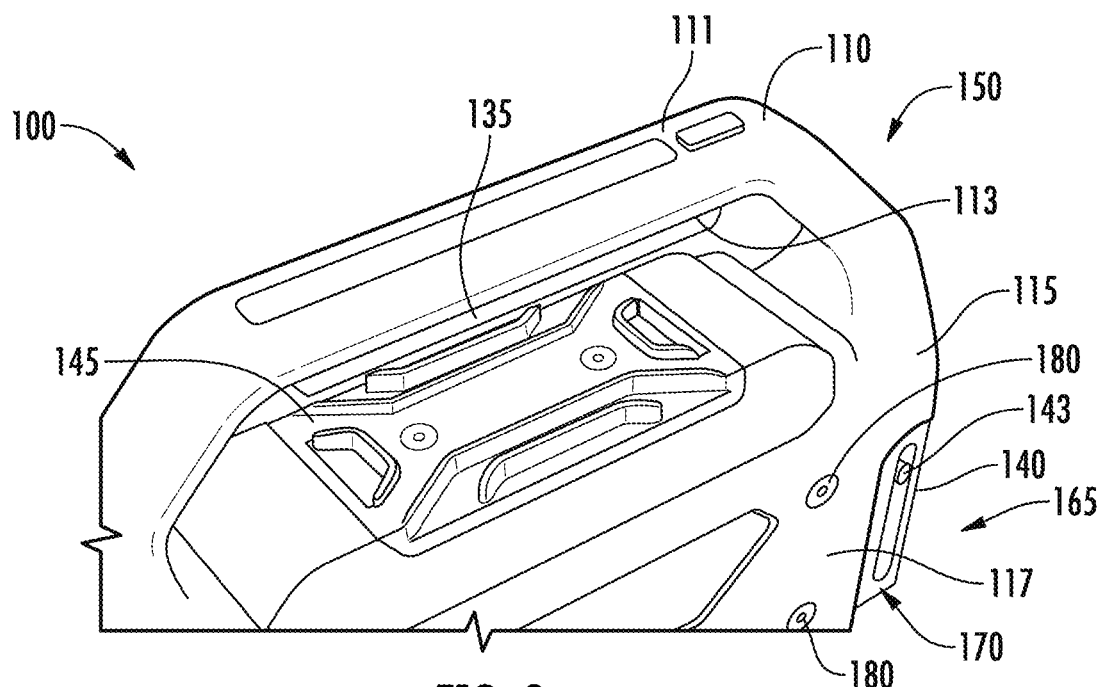
FIG. 3 is a perspective view of a portion of the battery assembly of FIG. 2.
Figure 4:
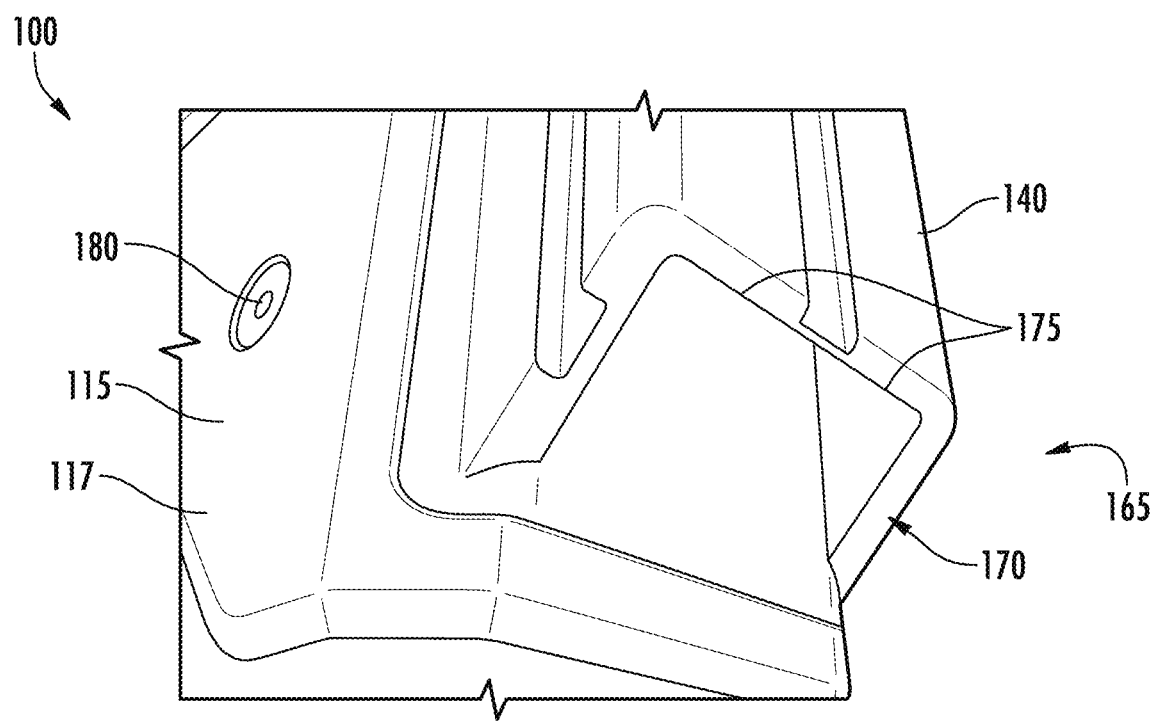
FIG. 4 is a perspective view of a portion of the battery assembly of FIG. 2.

Referring to FIGS. 2-4, the upper modular portion 115 includes a casing 117 and a handle 110 extending therefrom. The casing 117 surrounds the upper portion 150 of the battery pack 105. The casing 117 includes a mating feature 140 positioned proximate the right side 165 of the battery pack 105. The mating feature 140 includes an opening 170 having one or more ports 175 positioned therein. The ports 175 are configured to mate with a charging connector (not shown) on a charging station (e.g., charging systems 200, 400 in FIGS. 6-8). The mating feature 140 further includes a lock 143 (e.g., latch, clip) configured to couple and decouple (e.g., lock and unlock) the battery assembly 100 to a respective feature on a charging station and/or a piece of equipment.

The handle 110 includes an outer surface 111 and an inner surface 113 positioned nearer the battery pack 105 than the outer surface 111. The inner surface 113 includes a movable member 135 configured to be operable by the operator to unlock the battery assembly 100 from a charging station and/or a piece of equipment. When depressed, the movable member 135 moves inward toward the inner surface 113 and moves the lock 143 out of engagement with a respective feature on a charging station and/or piece of equipment. In this way, when an operator grasps the handle 110, the operator can, at the same time and with the same hand, easily depress the movable member 135 to disengage the battery assembly 100 from a piece of equipment or charging station.

Referring to FIG. 3, the battery pack 105 further includes a heat sink 145 formed therein proximate the upper portion 150 of the battery pack 105. The heat sink 145 acts to regulate the temperature of the battery pack 105 by transferring the heat generated from the battery pack 105 to a fluid medium (e.g., air) where the heat is then dissipated away from the battery pack 105. As shown in FIG. 3, the heat sink 145 is a cold plate heat sink, although other forms of heat sinks may be used.

Figure 5:
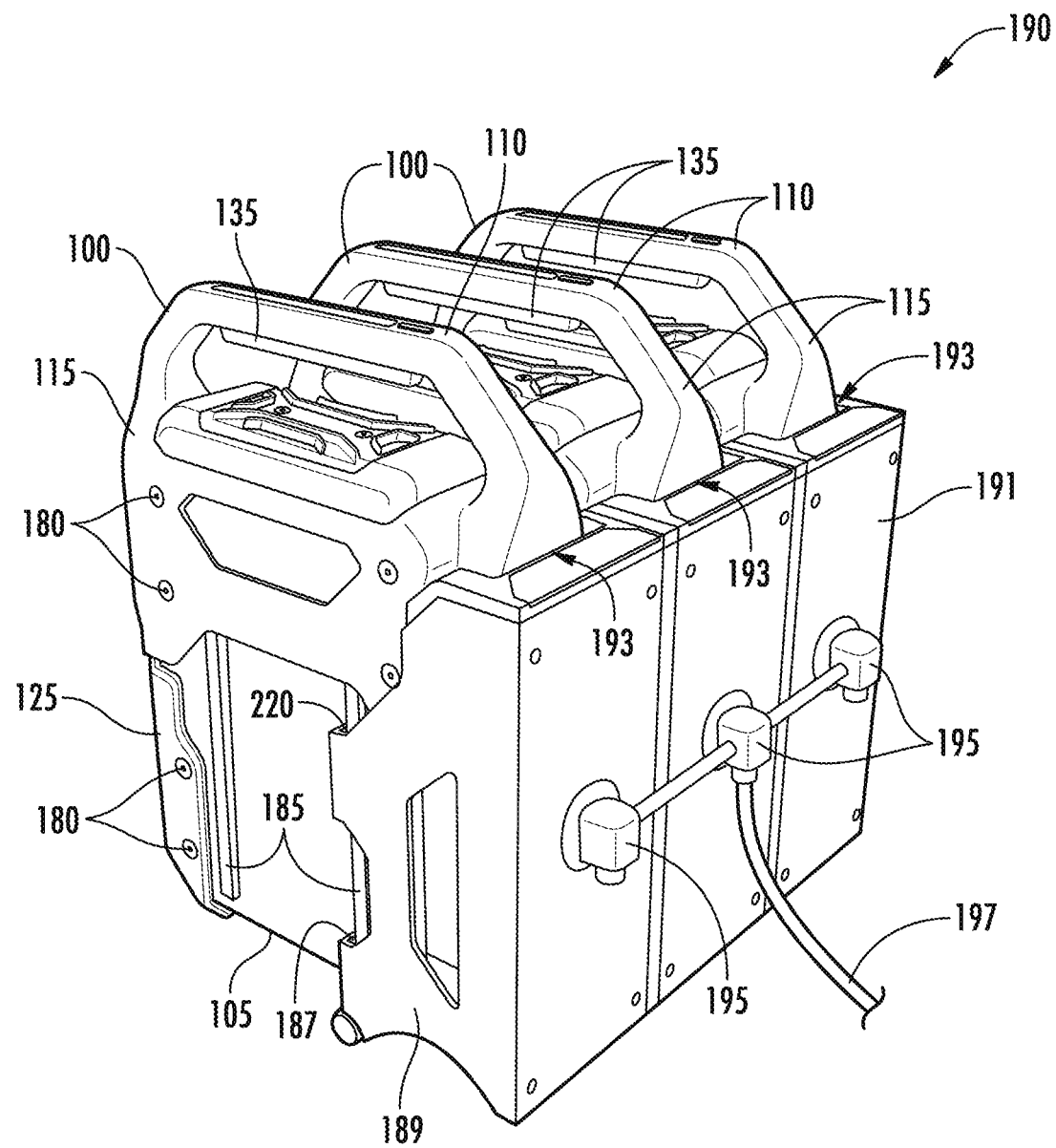
FIG. 5 is a perspective view of an integrated battery system including multiple battery assemblies of FIG. 2.

Referring to FIG. 5, multiple battery assemblies 100 can be used in an integrated battery system 190. An integrated battery system 190 can be used on a piece of equipment that requires more battery power than one battery assembly 100 provides. The integrated battery system 190 includes multiple battery receptacles 191 each having an opening 193. The battery receptacles 191 include partial walls 189 that include protrusions 187. The battery pack 105 includes one or more slots 185 (e.g., slits, niches) formed proximate the lower portion 155. The slots 185 are configured to engage the protrusions 187 (e.g., tabs) on the integrated battery system 190. The slots 185 and protrusions 187 are configured to engage with each other and align a battery pack 105 into each of the receptacles 191. A battery assembly 100 is slid into each of the battery receptacles 191 (e.g., each slot 185 receiving a protrusion 187) and connected via the mating feature 140 and ports 175 to a central power cord 197 via intermediate connectors 195 formed in the battery receptacles 191. The central power cord 197 may be connected to a charging station.

Figure 6:
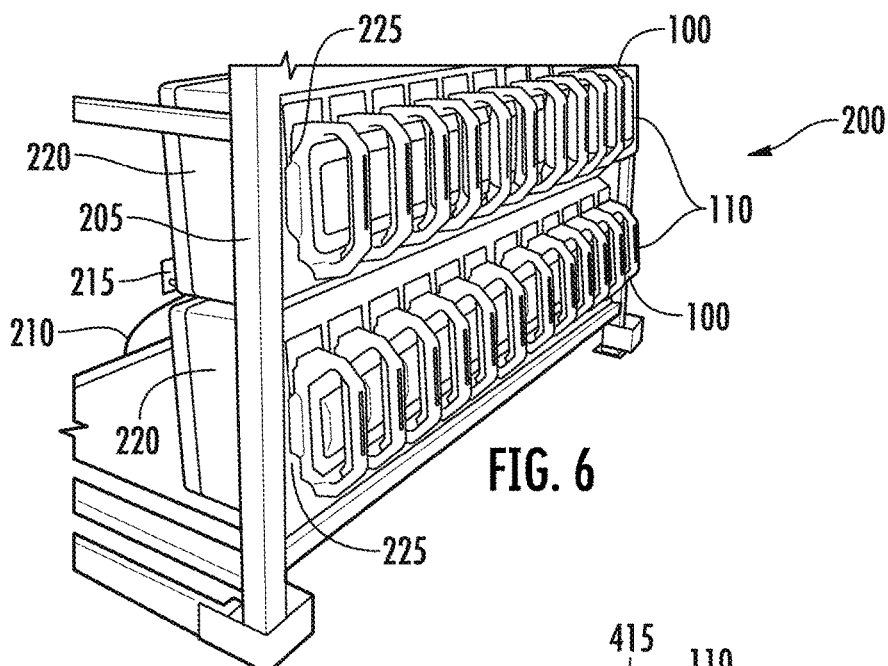
FIG. 6 is a perspective view of a rack charging system including multiple battery assemblies of FIG. 2.

Referring to FIG. 6, a rack charger system 200 is shown, according to one embodiment. The rack charger system 200 includes a rack 205 and one or more charging receivers 220 having battery receptacles 225. The one or more battery assemblies 100 are inserted into the battery receptacles 225 to be charged. When inserted, the battery assemblies 100 are electrically coupled to the charging receivers 220 (e.g., via ports 175 shown in FIG. 4) which are electrically coupled to a utility power source, such as an electrical cord 210 plugged directly into a wall outlet 215. In some embodiments, the charging receivers 220 may be configured to work with multiple types of utility power, as required. For example, the charging receivers 220 may be coupled to 120 VAC service, 240 VAC service, or even 480 VAC service to allow for multiple batteries to be charged. The rack charging system 200 may include power converters to transform the utility power to the proper voltage and current levels required to charge the one or more battery assemblies 100. The rack charging system 200 may further include one or more controllers configured to ensure proper charging of all the battery assemblies 100 received by the rack charger system 200. When an operator and/or employee desires to remove one of the battery assemblies 100, the handle 110 of the battery assembly 100 is grasped, the movable member 135 is engaged (e.g., squeezed, pushed in), the lock 143 (FIG. 1) is moved out of engagement with the battery receptacle 225, and the battery assembly 100 is removed by sliding the battery assembly 100 out of the receptacle 225. The battery assemblies 100 may also include visual indicators showing a battery charge level, etc. Using the rack charger system 200, the battery assembly 100 will fully charge in approximately 1 hour.

Figure 7:
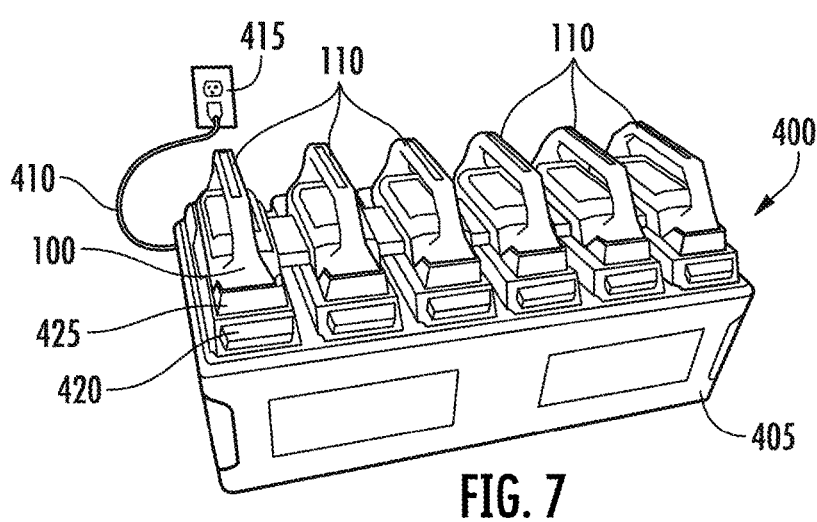
FIG. 7 is a perspective view of a bench top charging system including multiple battery assemblies of FIG. 2.

Referring to FIG. 7, a bench top charger system 400 is shown, according to an exemplary embodiment. The bench top charger system 400 includes a receptacle housing 405 having multiple battery receptacles 425. One or more battery assemblies 100 are inserted into the battery receptacles 425 to be charged. When inserted, the battery assemblies 100 are electrically coupled to the battery receptacles 425 (e.g., via ports 175 shown in FIG. 4), which are electrically coupled to a utility power source, such as an electrical cord 410 plugged directly into a wall outlet 415. When an operator and/or employee desires to remove one of the battery assemblies 100, the handle 110 of the battery assembly 100 is grasped, the movable member 135 (FIG. 2) is engaged (e.g., depressed, squeezed, pushed in), the lock 143 (FIG. 2) is moved out of engagement with the battery receptacle 425, and the battery assembly 100 is removed by sliding the battery assembly 100 out of the receptacle 425. Each battery assembly 100 includes a visual indicator or display 420 showing battery charge level, among other battery health indications. The visual indicator or display 420 may indicate different colors for different levels of battery charge. For example, the visual indicator or display 420 may use a red color to denote that the battery is not fully charged and a green color to denote that the battery is fully charged. Using the bench top charger system 400, the battery assembly 100 will fully charge in approximately 1 hour.

In some embodiments, the rack charger system 200 and/or the bench top charger system 400 use sequential charging while charging multiple battery assemblies 100. Sequential charging includes charging different battery assemblies 100 at different times so that not all battery assemblies 100 are charged at once potentially resulting in an overload on the utility service system. The sequential charging may determine which battery assemblies 100 need to be charged more than others by monitoring the charge levels of all connected battery assemblies 100 and supply charge to those assemblies 100 while switching off power supply to battery assemblies 100 that may already be fully charged.

Figure 8:
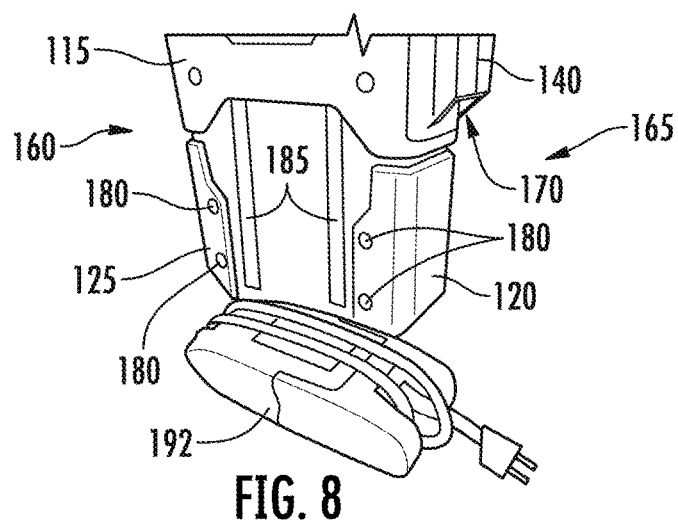
FIG. 8 is a perspective view of a battery assembly of FIG. 2 with a charging cord.

Referring to FIG. 8, a portable charger 192 for use with the battery assembly 100 is shown, according to one embodiment. The portable charger 192 is plugged into the ports 175 and into a wall outlet to provide charging to the battery assembly 100. Using the portable charger 192, the battery assembly 100 will fully charge in approximately 4 hours.

In addition to the charging systems described above, the battery assembly 100 can also be charged while inserted on the equipment or tool on which the battery assembly 100 is used. A user can leave the battery assembly 100 inserted and plug the equipment or tool into an outlet to charge the battery assembly 100. In this embodiment, the charging system is included with the tool or equipment such that no external charger is necessary.

Figure 9:
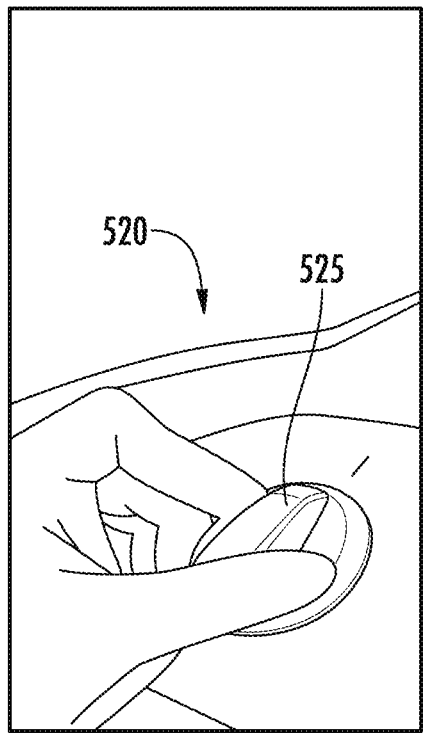
FIG. 9 is a perspective view of a portion of a user interface of a piece of outdoor power equipment.
Figure 10:
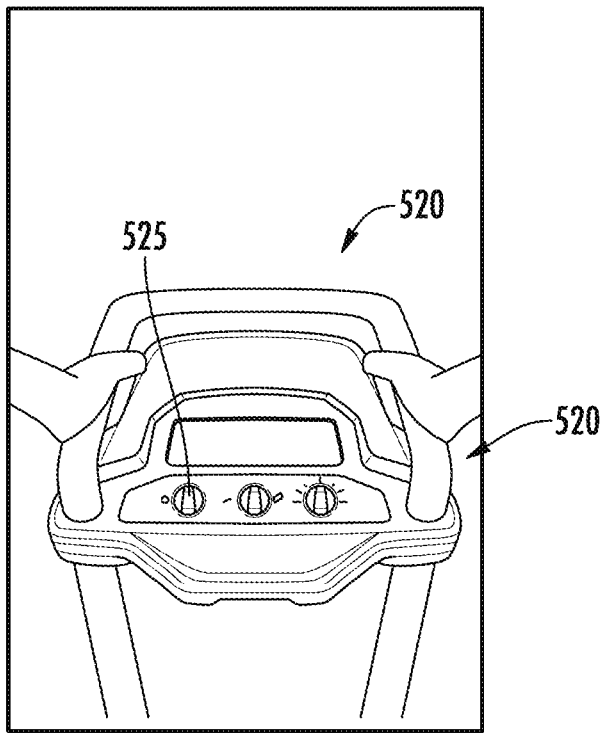
FIG. 10 is a front view of the user interface of FIG. 10.
Figure 11:
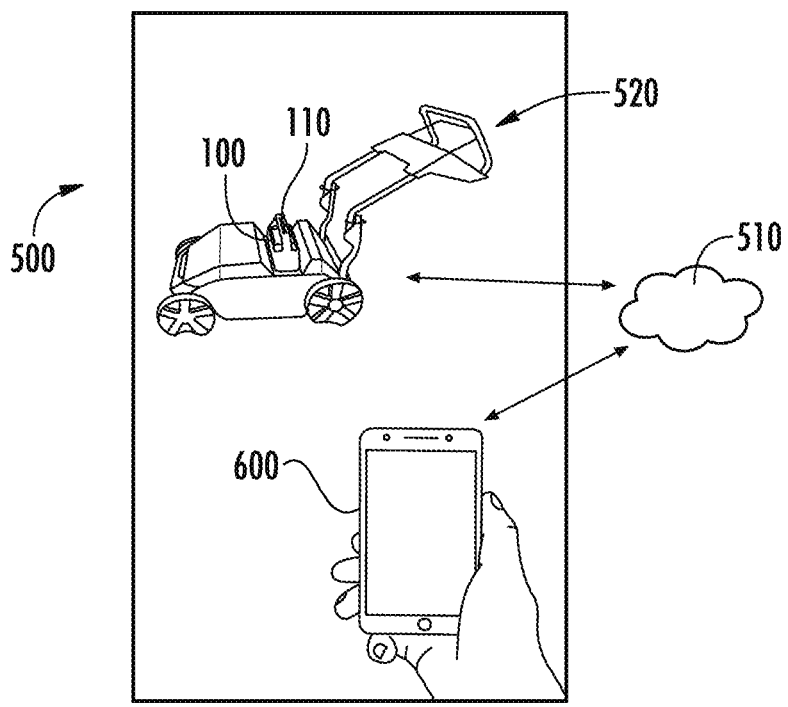
FIG. 11 is a perspective view of a communication system between a mobile device and the battery of FIG. 2, according to an exemplary embodiment.

Referring to FIGS. 9-11, a lawn mower 500 and a user interface 520 of the lawn mower 500 are shown. The user interface 520 includes a switch 525 (e.g., lever, knob, button, etc.). The switch 525 may rotate between an off position, where the battery assembly 100 is not electrically connected to components of the lawn mower 500, and an on position, where the battery assembly 100 is electrically connected to the components. As shown in FIG. 11, the battery assembly 100 is communicably coupled to a mobile device 600. The battery assembly 100 communicates various battery data and equipment data to the mobile device 600 for display.

Referring to FIG. 11, in some embodiments, the battery assembly 100 is connected to a network 510. In some embodiments, operators and/or employees communicate over the network 510 to the battery assembly 100 via mobile devices 600, such as smartphones, laptop computers, desktop computers, tablet computers, and the like. Accordingly, one or more mobile devices 600 are also connected to the network 510.

In some embodiments, the battery assembly 100 includes a network interface. In some arrangements, the network interface includes the hardware and logic necessary to communicate over multiple channels of data communication. For example, the network interface may include a Wi-Fi interface, a cellular modem, a Bluetooth transceiver, a Bluetooth beacon, an RFID transceiver, an NFC transceiver, or a combination thereof. The network interface facilitates data communication to and from the battery assembly 100 (and therefore the equipment (e.g., lawn mower 500) on which the battery assembly 100 is used).

Data communication between the battery assembly 100 and the mobile device 600 in various combinations may be facilitated by the network 510. In some arrangements, the network 510 includes cellular transceivers. In another arrangement, the network 510 includes the Internet. In yet another arrangement, the network 510 includes a local area network or a wide area network. The network 510 may be facilitated by short and/or long range communication technologies including Bluetooth transceivers, Bluetooth beacons, RFID transceivers, NFC transceivers, Wi-Fi transceivers, cellular transceivers, wired network connections, etc. As such, in one embodiment, the communication between the mobile device 600 and the battery assembly 100 can be facilitated by and connected to a cloud-based system via RFID and Wi-Fi connections on the battery assembly 100. In another embodiment, the communication can be facilitated by and connected to a cloud-based system via Wi-Fi only. In another embodiment, the communication can be facilitated by and connected to a cloud-based system via cellular transceivers. In yet another embodiment, the communication can be facilitated by and connected to a cloud-based system via Bluetooth and cellular transceivers. In still another embodiment, the communication can be facilitated by and connected to a cloud-based system and used with a self-vending system with which customers or operators can interact to rent the battery assemblies 100. In all such embodiments, the cloud-based system can be made accessible to a third party, such as a consumer and/or rental company.

The battery assembly 100 may include one or more circuits configured to monitor the state of the battery assembly 100 or other aspects of the equipment with which the battery assembly 100 is used. A circuit may be further configured to monitor the state of the battery to predict the number of starts capable with the battery. For example, a circuit may monitor the state of charge of the battery, the average amount of power expended to start and run the equipment, and/or other characteristics of the equipment (e.g., run state, RPMs, etc.). The average amount of power expended to start the equipment and/or characteristics of the equipment may be communicated to the circuit through one or more of the terminals coupling the battery assembly 100 to the receiver. The number of starts capable with the battery assembly 100 may then be shown on a display integrated into the battery (e.g., the display 420 shown in FIG. 7) or a display provided elsewhere, such as on a control panel or user interface. The number of starts capable with the battery assembly 100 may also be communicated to the mobile device 600 and displayed on a user interface of the mobile device 600. The number of starts capable with the battery assembly 100 may be calculated based on the characteristics of the equipment, for example, a battery having a specific charge may be able to perform more starts for one type of outdoor power equipment (e.g., a pressure washer) than for another type of outdoor power equipment (e.g., a lawn mower).

A circuit may be further configured to monitor other characteristics of the equipment by communicating with sensors and monitoring devices (e.g., fluid level sensors, temperature sensors, pressure sensors, chronometers, etc.). The circuit may output data related to the information received from the sensors and monitoring devices to a display, such as the display 420 (FIG. 7) integrated into the battery assembly 100 or a display shown on a user interface of a mobile device 600. The display may therefore communicate to the user of the equipment various operational data related to the equipment and the battery assembly 100. For example, the circuit may output to the display information such as operational time, battery charge, or battery temperature. Additionally, the circuit may monitor the temperature of the battery assembly 100 via an input from a temperature sensor. Temperature monitoring can be used to alert the user (e.g., via the display 420, user interface of the mobile device 600) if the battery temperature is too low for normal use of the battery. Using the battery assembly 100 to power these circuits allows information to be provided to the user (e.g., battery temperature, battery charge level) prior to the equipment being started so that any issues can be addressed before attempting to start the equipment.

Figure 12:
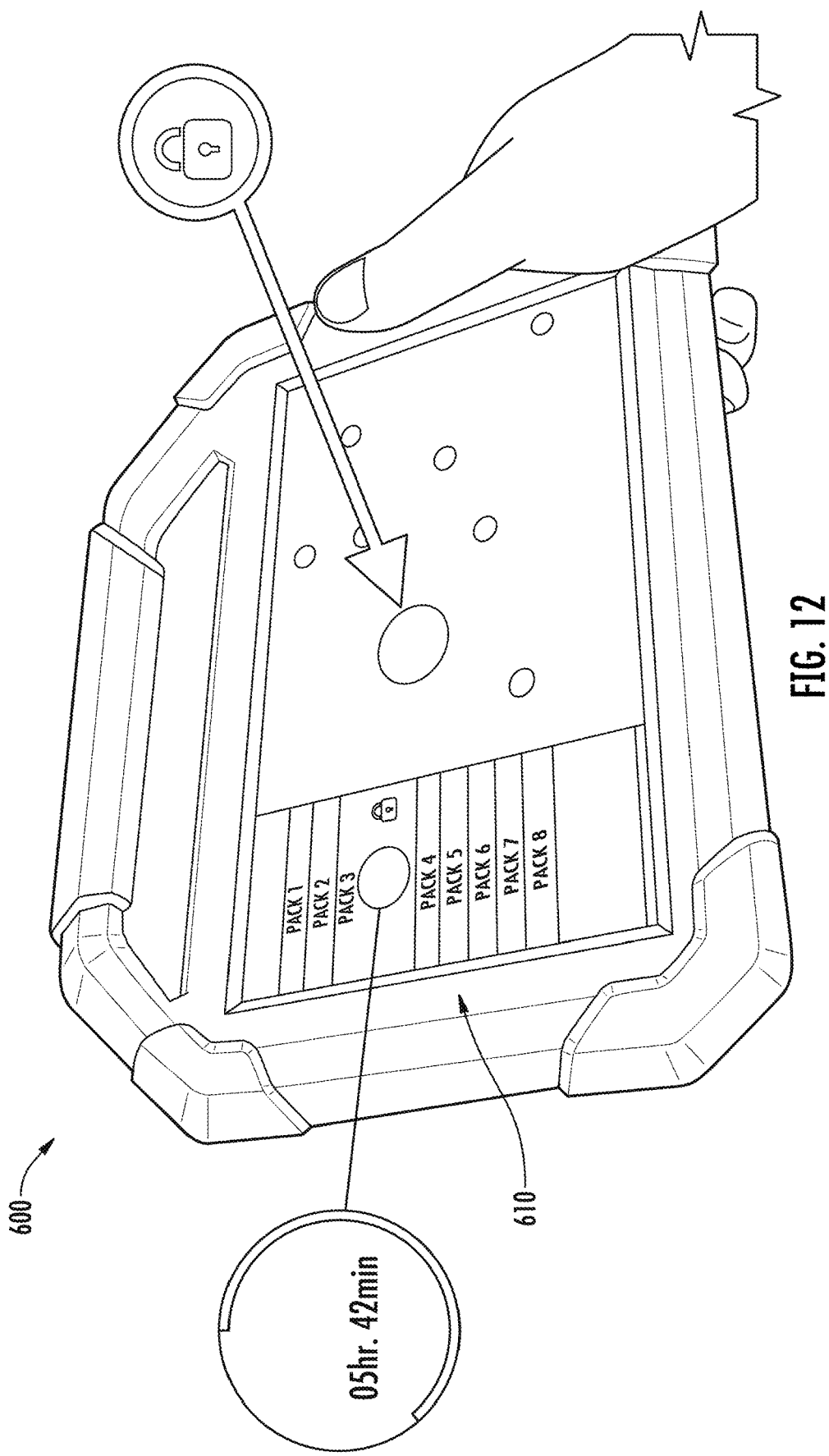
FIG. 12 is a perspective view of a user interface of a mobile device.

Referring to FIG. 12, a mobile device 600 displaying a user interface 610 is shown. The user interface 610 displays data received from the battery assembly 100 remotely. The user interface 610 displays, among other data, information relating to battery runtime, battery health, and battery location (e.g., using a Global Positioning System on the battery assembly 100). The user interface 610 may allow an employee and/or operator to remotely lock out the battery assembly 100 such that the battery assembly 100 will not operate to provide power. In this way, the battery assemblies 100 can be tracked and shut down if a theft is determined to likely have occurred. In addition, using remote tracking and operation, an employee of a rental company can lock out the battery assembly 100 when a rental period expires. The operator of the battery assembly 100 can then be prompted via an application on their own mobile device whether they would like to extend the rental period and can do so remotely. By interacting with an application displayed on an operator's mobile device, the operator can also preemptively extend the rental period, transmitting a notification to the rental company and/or employee of the rental company.

Figure 13:
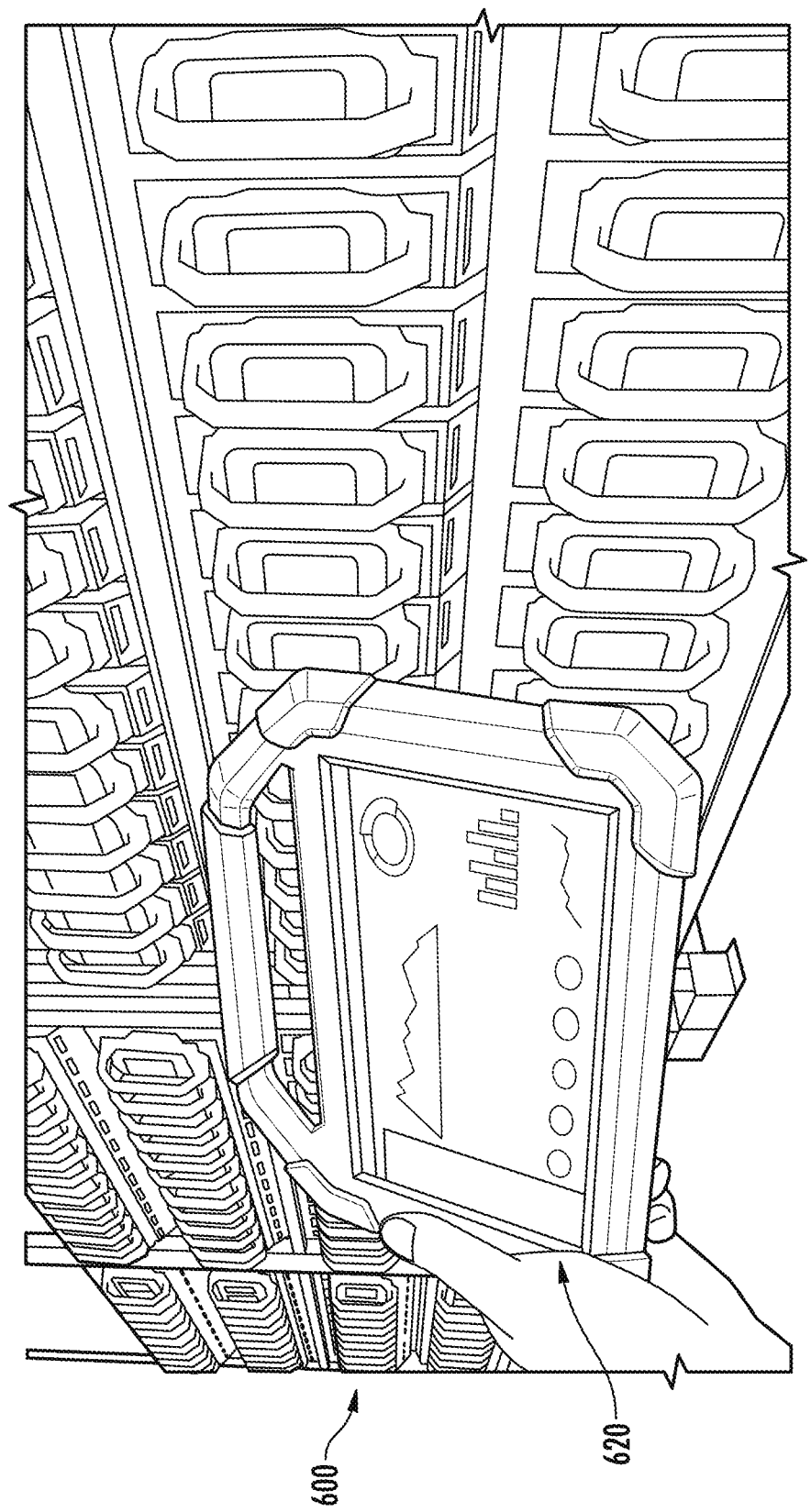
FIG. 13 is a perspective view of a user interface of a mobile device.

Referring to FIG. 13, a mobile device 600 displaying another user interface 620 is shown. The user interface 620 displays battery assembly charge and health data. An operator or employee of a rental service may use the user interface 620 to track the battery charge levels across multiple battery assemblies 100 to determine which of the battery assemblies 100 may be fully charged and thus, ready to use and/or rent out. In addition, the battery assemblies 100 can be chosen for certain pieces of equipment based on various parameters associated with the battery assemblies 100, such as State of Health (SoH), State of Charge (SoC), the amount of charge on the battery, etc. For example, a piece of equipment that requires less battery charge may be able to use a battery assembly 100 with less charge than a piece of equipment that requires a fully charged battery for practical use. A rental company may track the charge of the battery assemblies 100 to determine whether to rent out a particular battery assembly 100 to a customer based on which equipment the operator is desiring to use the battery assembly 100. The user interface 620 may also display other health characteristics, such as which battery assemblies 100 may be failing to charge properly.

In some embodiments, a user can reserve a battery assembly 100 prior to arriving at a rental company using their mobile device. Upon arriving at the rental company, the user is directed to the proper battery assembly 100 (e.g., a particular battery assembly 100) by a display on their mobile device. For example, the mobile device may display a map of the rental company store and indicate where the battery assembly 100 is located within the store. The mobile device may additionally or alternatively display text indicating which part of the store the battery assembly 100 is located. Once locating the proper battery assembly 100, the user can use their mobile device (e.g., via NFC, Bluetooth, etc.) to communicate with the battery assembly 100 to perform a check out procedure. By using the mobile device to check out the battery assembly 100, mobile device information (e.g., unique code transmitted by the mobile device, etc.) is communicated to the battery assembly 100 and the user is authenticated via their mobile device. Up until the point where the user is authenticated and checks out the battery assembly 100, the battery assembly 100 can remain locked.

Figure 14:
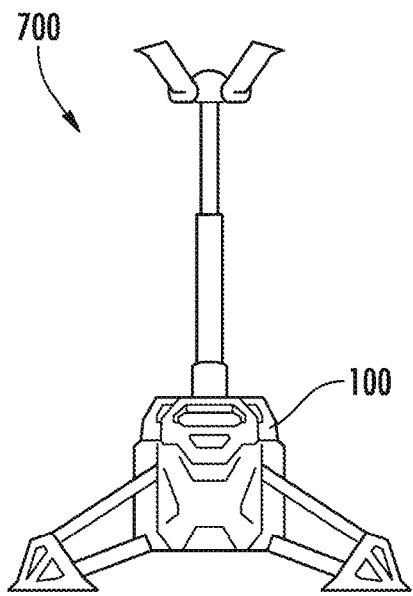
FIG. 14 is a front view of a light tower, according to an exemplary embodiment.
Figure 15:
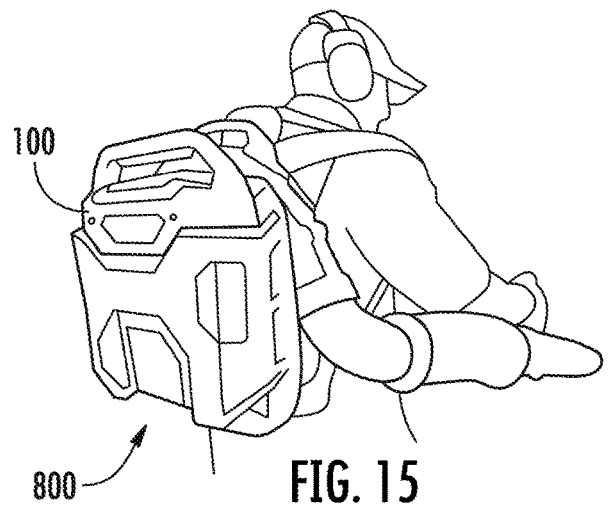
FIG. 15 is a perspective view of a backpack blower, according to an exemplary embodiment.
Figure 16:
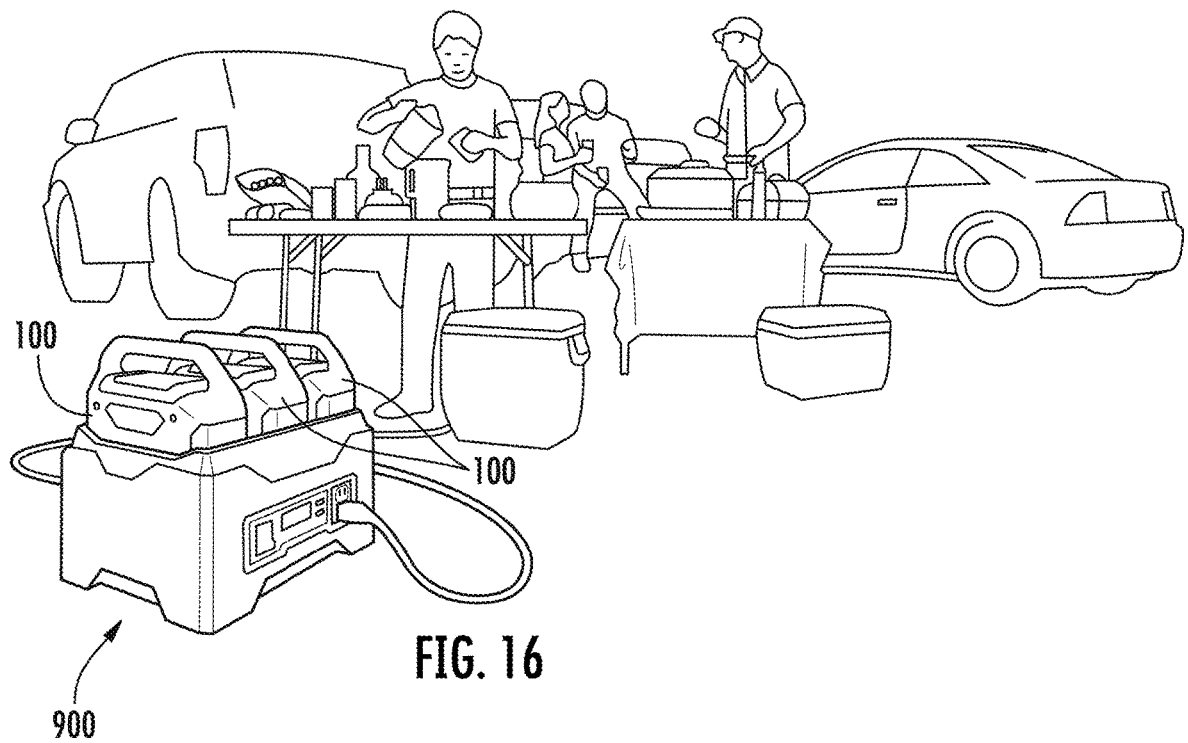
FIG. 16 is a perspective view of a generator, according to an exemplary embodiment.

Referring to FIG. 14, the battery assembly 100 is shown in use on a light tower 700. The battery assembly 100 may be positioned in a base of the light tower 700. Accordingly, the light tower 700 may be easily transportable for use at construction sites, etc. Referring to FIG. 15, the battery assembly 100 is shown in use on a backpack blower 800. The battery assembly 100 is positioned within the backpack portion of the backpack blower 800 such that an operator carries the battery assembly 100 on his or her back while using the blower 800. Accordingly, the blower 800 is easily transportable. Referring to FIG. 16, three battery assemblies 100 are shown in use with a generator 900. As such, the battery assemblies 100 can be used to power a generator 900 and an operator can plug equipment and/or other electrical devices into the generator 900 to power such equipment remote from a power grid.

Figure 17:
FIG. 17 is a perspective view of various pieces of indoor and outdoor power equipment using the battery of FIG. 2.

Referring to FIG. 17, various types of equipment that can use one or more battery assemblies 100 are shown. As shown, the battery assembly 100 can be used with various types of indoor and outdoor power equipment, as well as with portable jobsite equipment. Examples of such equipment are floor sanders, floor buffers and polishers, cement rollers, power washers, vacuums, overseeders, sweepers, sod cutters, brush mowers, portable generators, heaters, etc.

Figure 18:
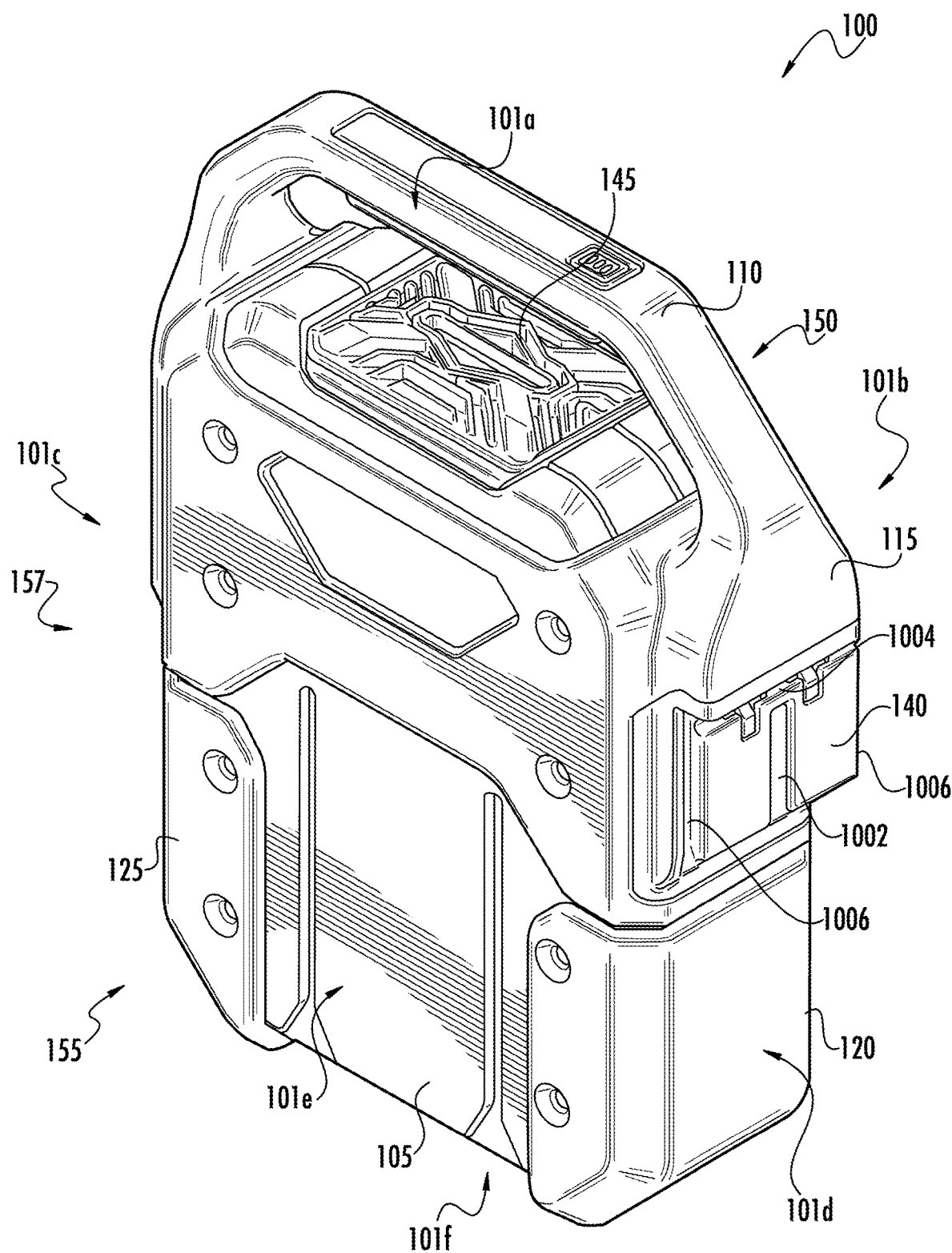
FIG. 18 is a perspective view of the battery assembly of FIG. 2, shown to include a mating feature.
Figure 19:
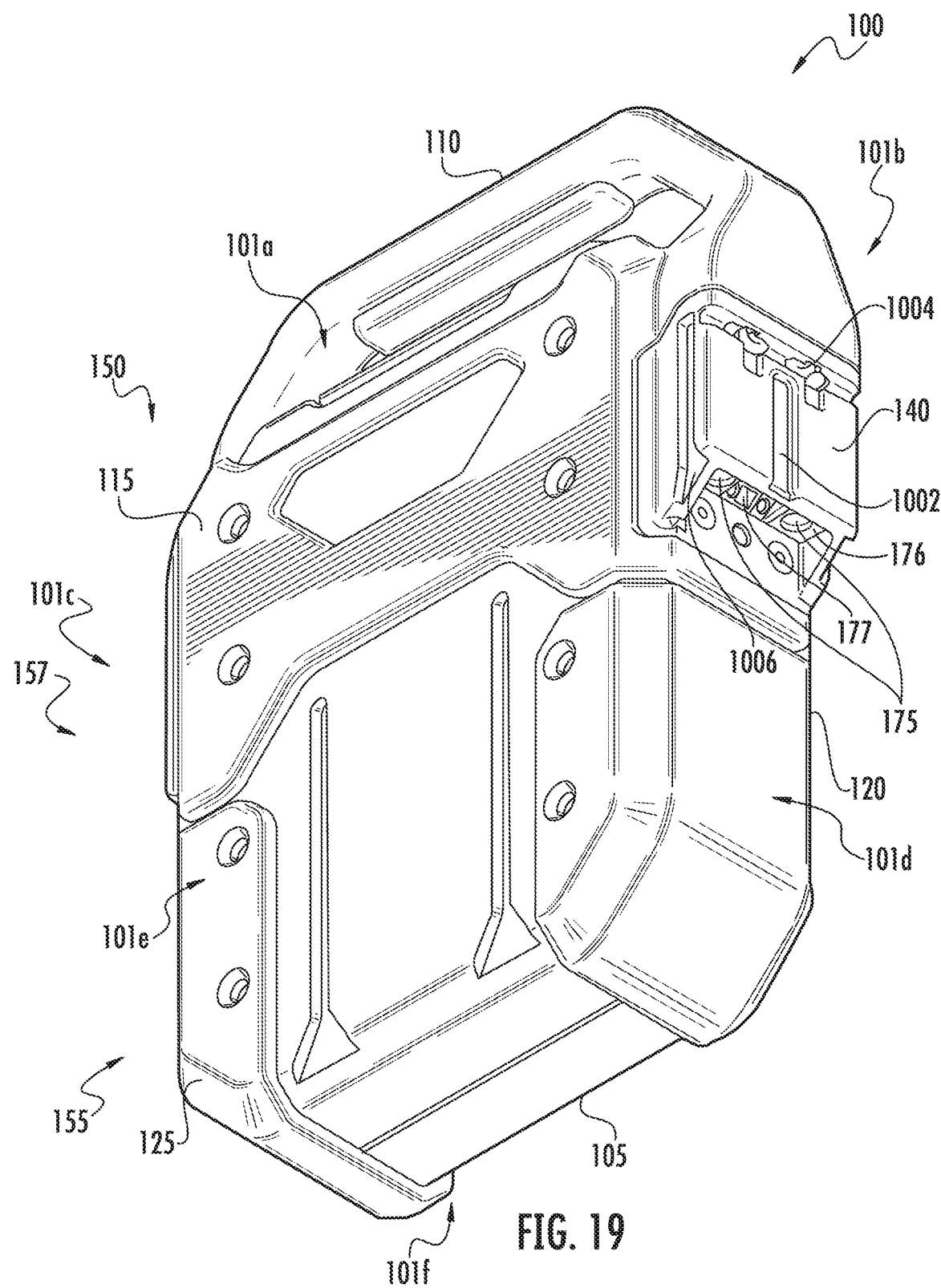
FIG. 19 is a perspective view of the battery assembly of FIG. 2, shown to include a mating feature.

Referring now to FIGS. 18-19, perspective views of battery assembly 100 are shown, according to some embodiments. Battery assembly 100 is shown to include mating feature 140. Mating feature 140 includes a channel, shown as channel 1004. Channel 1004 may be defined by a recession in mating feature 140. Mating feature 140 may also include a front channel, shown as front channel 1002, and side channels, shown as side channels 1006. Front channel 1002 and side channels 1006 may be configured to interface with channels of a receptacle (not shown) to guide and attach battery assembly 100 to the receptacle. Channel 1004 may be configured to interface with a pin (shown as snap pin 1005 in FIG. 20) to selectively attach battery assembly 100 and the receptacle.

Battery assembly 100 is also shown to include ports 175. Ports 175 are configured to electrically connect battery assembly 100 to a charging station, as described with reference to FIGS. 5-7. Ports 175 may be electrically connected to battery cells contained within battery assembly 100. The battery cells are rechargeable cells having lithium-ion or other rechargeable battery chemistry. The ports 175 are part of a connector 176 that includes at least two electrical ports 175 (e.g., positive and negative electrical ports or terminals) and a data terminal or port 177. The electrical ports 175 complete an electrical circuit between the cells of the battery assembly 100 and the equipment to be powered by the battery assembly 100 or a charging station for charging the battery assembly 100. The data port 177 provides a hardwired physically connected communication link between the battery assembly 100 and the equipment it is connected to or a charger or charging station that is connected to. The data connection possible via the data port 177 allows the battery assembly 100 to send and receive data relevant to the battery assembly itself (e.g., operating characteristics, charge level, battery life, faults related to over temperature, under temperature, over voltage, under voltage, remaining battery life) or relevant to the equipment or charging device the battery is connected to (e.g., estimated run time, type of equipment and related information, type of charging station and related information) or other data and transfer of data as describe elsewhere in this application. The data port 177 may provide for communication via controller area network (CAN) or other standard or proprietary communication protocols. The data port 177 is provided between the two electrical ports 175. This arrangement helps to protect the data port 177 from being inadvertently connected to the electrical circuit, rather than the data circuit, between the battery assembly 100 and the device it is connected to. Even if the connector 176 were to be one hundred eighty degrees off from its proper alignment such that the positive and negative electrical ports 175 were aligned with the opposite connection port or terminal, the data port 177 would still be aligned with its corresponding connection port or terminal of the device being connected to due to its location between the two electrical ports 175. To achieve this, the electrical ports 175 may be symmetrically arranged about the data port 177 and may be equidistantly spaced from the data port 177. In other embodiments, the connector 176 includes more than two electrical ports (e.g., three electrical ports to provide or receive three phase electrical power). In these embodiments, the data port 177 is still positioned between two of the electrical ports 175.

Including the connector 176 in the mating feature 140 that is on the side of the battery assembly 100 and that protrudes or extends away from the main body or main portion of the battery assembly 100, a user is able to visually verify that the mating feature 140 has made a mechanical connection between the battery assembly 100 and the device it is connected to, but to also verify that the electrical and data connections are also made between the battery assembly 100 and the device it is connected to. Having the mechanical and electrical connections at a single location (the mating feature 140) provides the user with a single connection point that achieves both connection types of concern to the user (i.e., mechanical and electrical connection), thereby simplifying the connection process from an arrangement having separate mechanical and electrical connection points, helps the user to successfully achieve both types of connections by providing a single location to monitor during connection of the battery, and having the mating feature 140 extend away from the main body of the battery assembly 100 prevents the connection point from being blocked from the user's view of the main body of the battery assembly 100 during connection.

Referring now to FIG. 18, battery assembly 100 is shown. Battery assembly 100 is shown to include battery pack 105, upper portion 150, lower portion 155, side portion 157, upper modular portion 115, and lower module portions 120 and 125. Battery assembly 100 includes a top face 101a, a front face 101b, a left side 101c, a right side 101d, a rear face 101e, and a bottom face 101f. In some embodiments, upper portion 150 is a top portion and may include top face 101a, at least some of battery pack 105, and at least some of upper modular portion 115. In some embodiments, lower portion 155 is a bottom portion may include lower module portions 120 and 125, bottom face 101f, and at least some of battery pack 105. In some embodiments, upper portion 150 is opposite lower portion 155. In some embodiments, top face 101a is opposite bottom face 101f. Handle 110 is located above the upper portion 150, according to some embodiments. In some embodiments, side portion 157 includes any of battery assembly 100 disposed between upper portion 150 and lower portion 155. In some embodiments, side portion 157 includes any of battery assembly 100 disposed between upper portion 150 and lower portion 155 and not included in upper portion 150 and lower portion 155. In some embodiments, side portion 157 connects upper (top) portion 150 and lower (bottom) portion 155. Battery assembly 100 is shown to include heat sink 145, according to some embodiments. In FIG. 18, heat sink 145 is shown positioned on top face 101a of battery assembly 100, directly under handle 110. In some embodiments, heat sink 145 may be disposed on any of front face 101b of battery assembly 100, left side 101c of battery assembly 100, right side 101d of battery assembly 100, and rear face 101e of battery assembly 100. In some embodiments, right side 101d is the same as right side 165 as described in greater detail above with reference to FIG. 2. In some embodiments, left side 101c is the same as left side 160 as described in greater detail above with reference to FIG. 2. Heat sink 145 may be configured dissipate heat energy from battery assembly 100. In some embodiments, multiple heat sinks 145 may be used. Heat sinks 145 may each be disposed on any of top face 101a, front face 101b, left side 101c, right side 101d, and rear face 101e of battery assembly 100, according to some embodiments. For example, in some embodiments, a first heat sink may be disposed on the top face 101a of battery assembly 100 (as shown in FIG. 18), while a second heat sink may be disposed on the rear face 101e of battery assembly 100.

Referring still to FIG. 18, mating feature 140 is shown disposed on right side 101d. In some embodiments, mating feature 140 may be disposed on any of top face 101a, front face 101b, left side 101c, right side 101d, and rear face 101e of battery assembly 100, according to some embodiments. The placement of mating feature 140 may correspond to an insertion orientation of battery assembly 100. As shown in FIG. 18, mating feature 140 is disposed on right side 101d, which may correspond to a vertical insertion orientation of battery assembly 100, according to some embodiments. Battery assembly 100 may also be configured to be inserted into a receptacle at a horizontal orientation. For example, if mating feature 140 is positioned on front face 101b, battery assembly 100 may be configured to be inserted into a receptacle at a horizontal insertion orientation. In some embodiments, mating feature 140 may be oriented in different directions. For example, mating feature 140 may be oriented in a direction such that an axis which extends out of ports 175 intersects a plane parallel to front face 101b and/or rear face 101e. Mating feature 140 may be positioned at any location along right side 101d or left side 101c. In the embodiment shown in FIG. 18, mating feature 140 is shown positioned at approximately equal distances from a top of handle 110 of battery assembly 100 and a bottom of battery assembly 100. In some embodiments, mating feature 140 may be positioned closer to the top of battery assembly 100 or closer to the bottom of battery assembly 100. In some embodiments, two mating features 140 may be used. For example, a first mating feature may be disposed on right side 101d (as shown in FIG. 18), while a second mating feature may be disposed on left side 101c, according to some embodiments. In some embodiments, only one of the first and second mating features includes ports 175 (as shown in FIG. 19) which are configured to electrically connect battery cells of battery assembly 100 to power equipment or charging stations, while the other mating feature merely aids in selectively attaching battery assembly 100 to the power equipment or charging station.

Referring now to FIG. 19, a perspective view of battery assembly 100 is shown, according to some embodiments. Handle 110 is shown positioned above top face 101a of battery assembly 100. In some embodiments, handle 110 may be positioned on right side 101d, left side 101c, front face 101b, or rear face 101e and may be oriented in any direction (e.g., a top face of handle 110 may be parallel to front face 101b or right side 101d). The position and orientation of handle 110 may provide additional ergonomics and ease of insertion relative to whether battery assembly 100 is configured to be horizontally or vertically inserted into the receptacle. In some embodiments, more than one handle 110 may be used. In some embodiments, the handles 110 may be positioned on different sides/faces of battery assembly 100 and may be positioned in different orientations. For example, one of the handles 110 may be positioned and oriented as shown in FIG. 19, while another handle 110 may be positioned on rear face 101e at a different orientation relative to the handle shown in FIG. 19. In some embodiments, the handles 110 may be positioned in different positions and orientations relative to ports 175, than the position and orientation of handle 110 relative to ports 175 as shown in FIG. 19.

Figure 20:
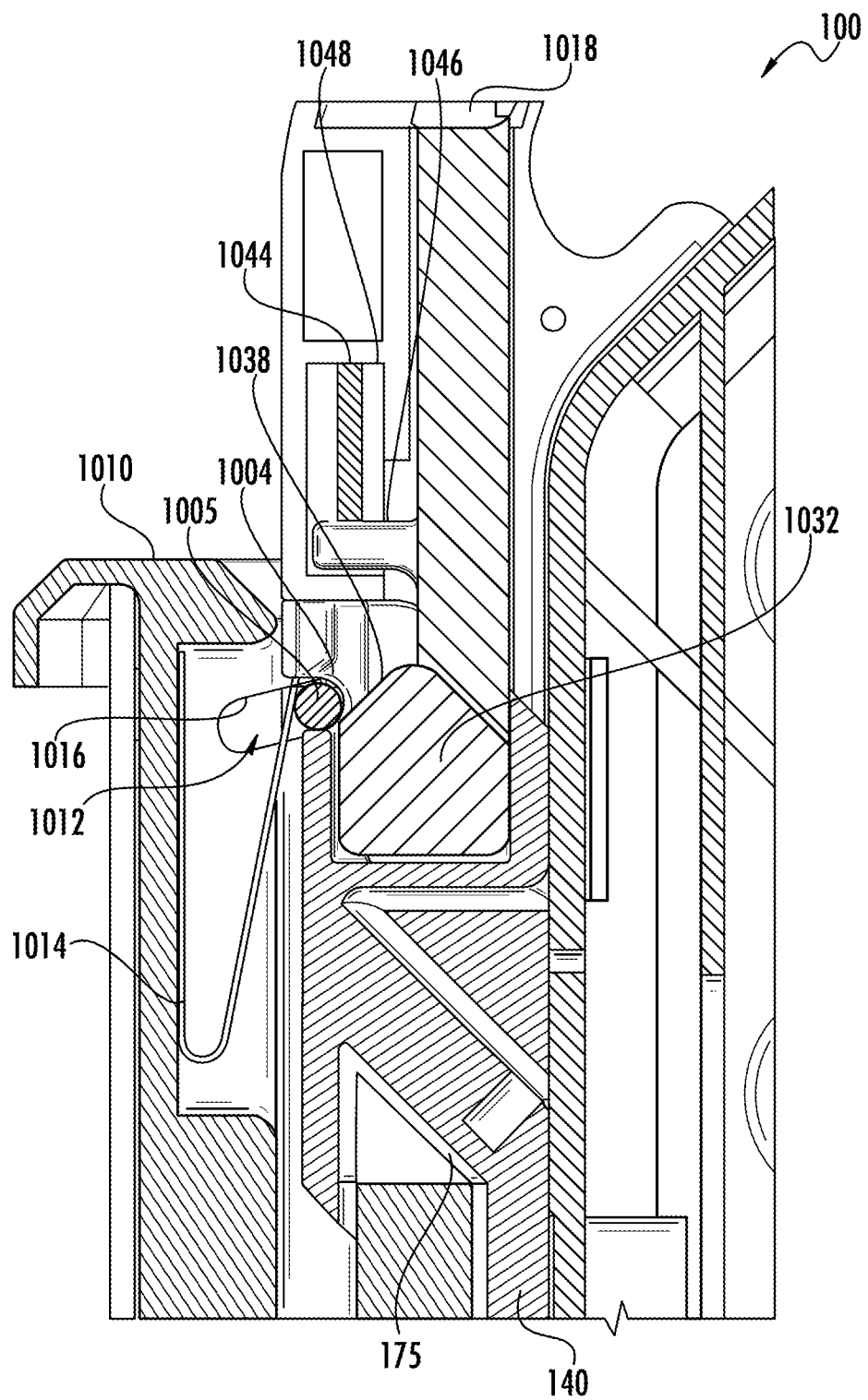
FIG. 20 is a section view of the mating feature of the battery assembly of FIG. 2.

Referring now to FIG. 20, a section view of mating feature 140 is shown, according to some embodiments. Mating feature 140 includes release button 1018, snap pin 1005, spring 1014, and a slot, shown as slot 1012. Slot 1012 is formed by a channel 1004 of mating feature 140 and a slot 1016 of a receptacle 1010. In some embodiments, receptacle 1010 is battery receptacle 425, battery receptacle 121, battery receptacle 225, a receptacle of a power tool, or any other battery receptacle configured to interface with mating feature 140. Snap pin 1005 is configured to travel within slot 1012. Spring 1014 interfaces at one end with receptacle 1010, and at another end with snap pin 1005. In some embodiments, snap pin 1005 is configured to interface with a surface of protrusion 1032 of release button 1018, such that as release button 1018 moves, snap pin 1005 moves within slot 1012.

Figure 21:
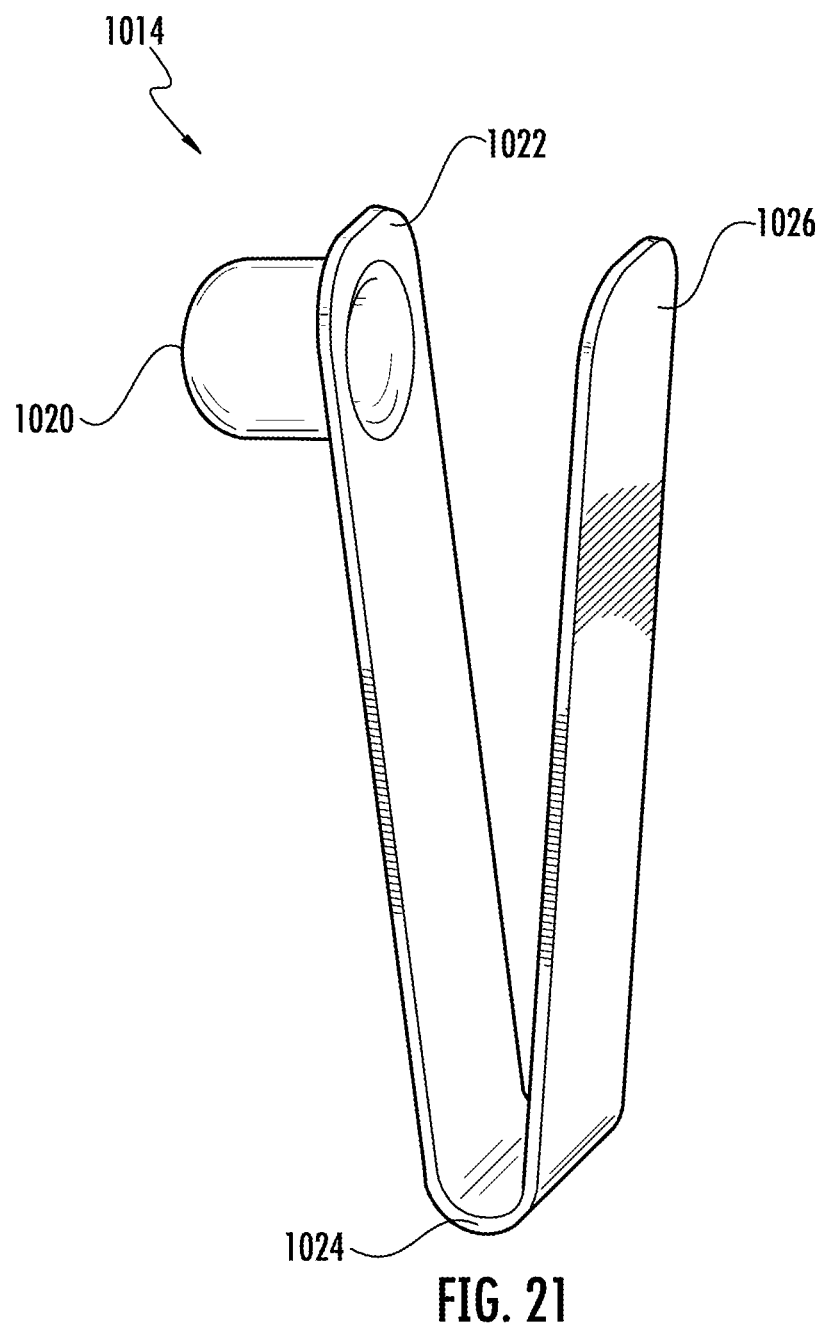
FIG. 21 is a perspective view of an extension spring of the mating feature of the battery assembly of FIG. 2.

Referring now to FIG. 21, a perspective view of spring 1014 is shown, according to some embodiments. Spring 1014 is shown to include a first end 1026, an elbow 1024, and a second end 1022. Spring 1014 is shown to include a protrusion 1020 positioned at second end 1022. In some embodiments, protrusion 1020 interfaces with a recess (not shown) of receptacle 1010. Spring 1014 may have a generally rectangular cross section and may be made of spring steel according to some embodiments. In some embodiments, first end 1026 is configured to interface with snap pin 1005.

Figure 22:
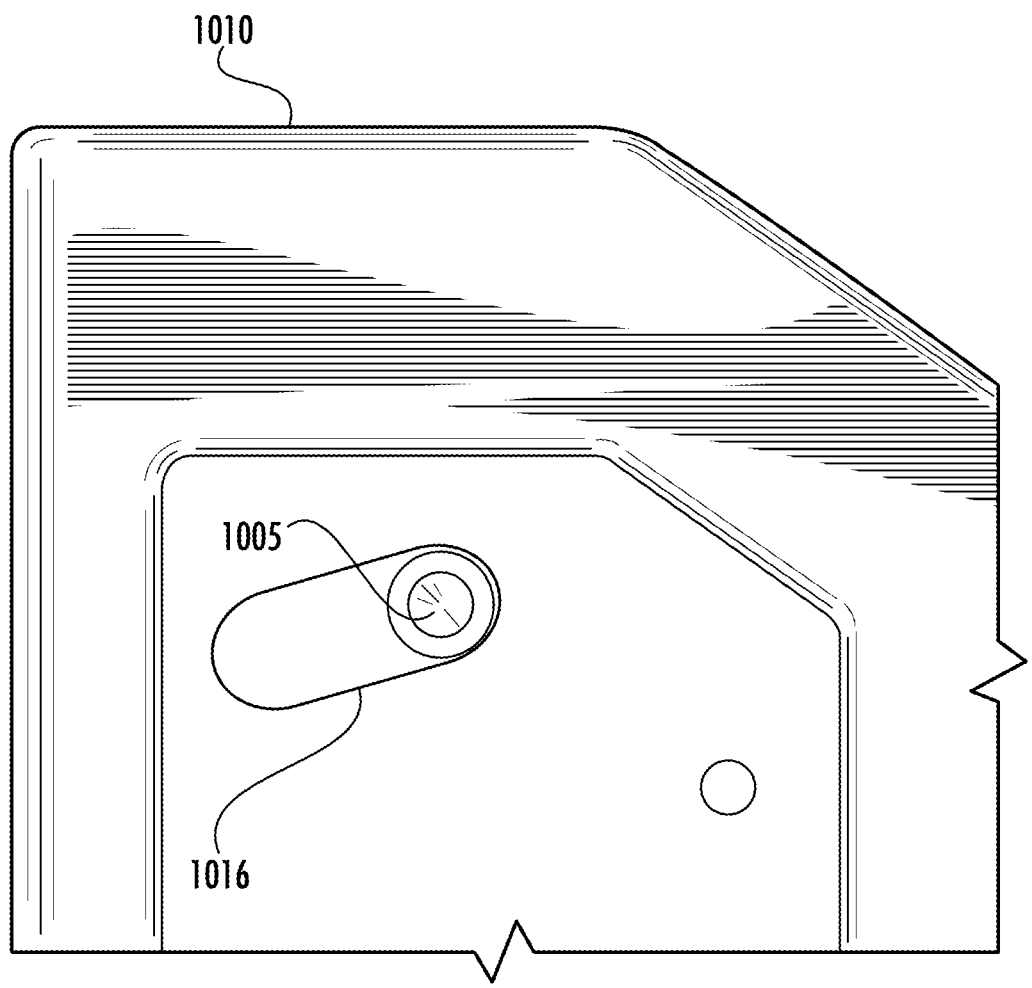
FIG. 22 is a side view of a receptacle configured to interface with the mating feature of the battery assembly of FIG. 2.
Figure 23:
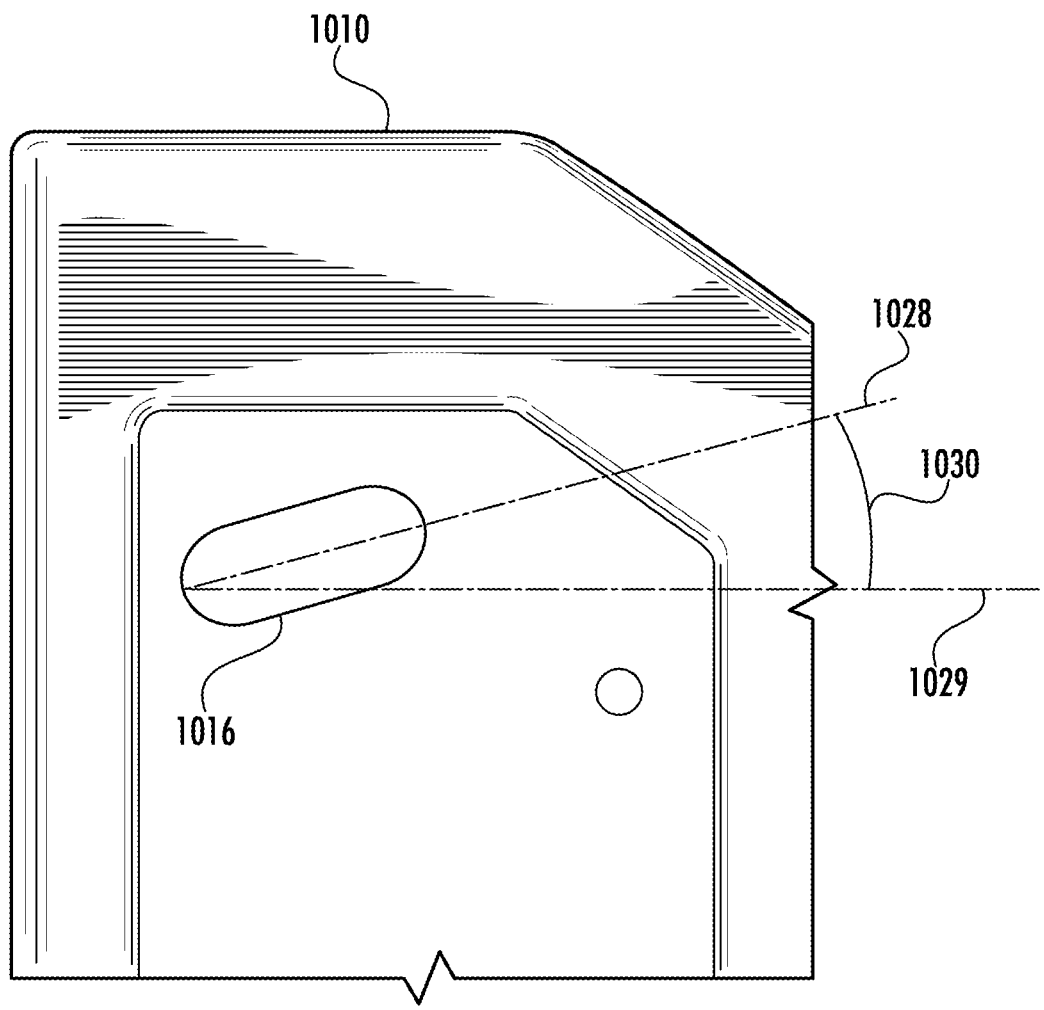
FIG. 23 is a side view of a receptacle configured to interface with the mating feature of the battery assembly of FIG. 2.

Referring now to FIGS. 22-23, a front view of a portion of receptacle 1010 is shown, according to some embodiments. Receptacle 1010 is shown include slot 1016. Snap pin 1005 is configured to travel within slot 1016. Slot 1016 is shown to be oriented at angle 1030, where angle 1030 is defined as an angle between horizontal centerline 1029 of receptacle 1010 and centerline 1028 of slot 1016. In some embodiments, angle 1030 may be any value between 10 and 30 degrees. In some embodiments, angle 1030 is more than 30 degrees or less than 10 degrees. Snap pin 1005 may be configured to travel within slot 1015 along centerline 1028.

Figure 24A:
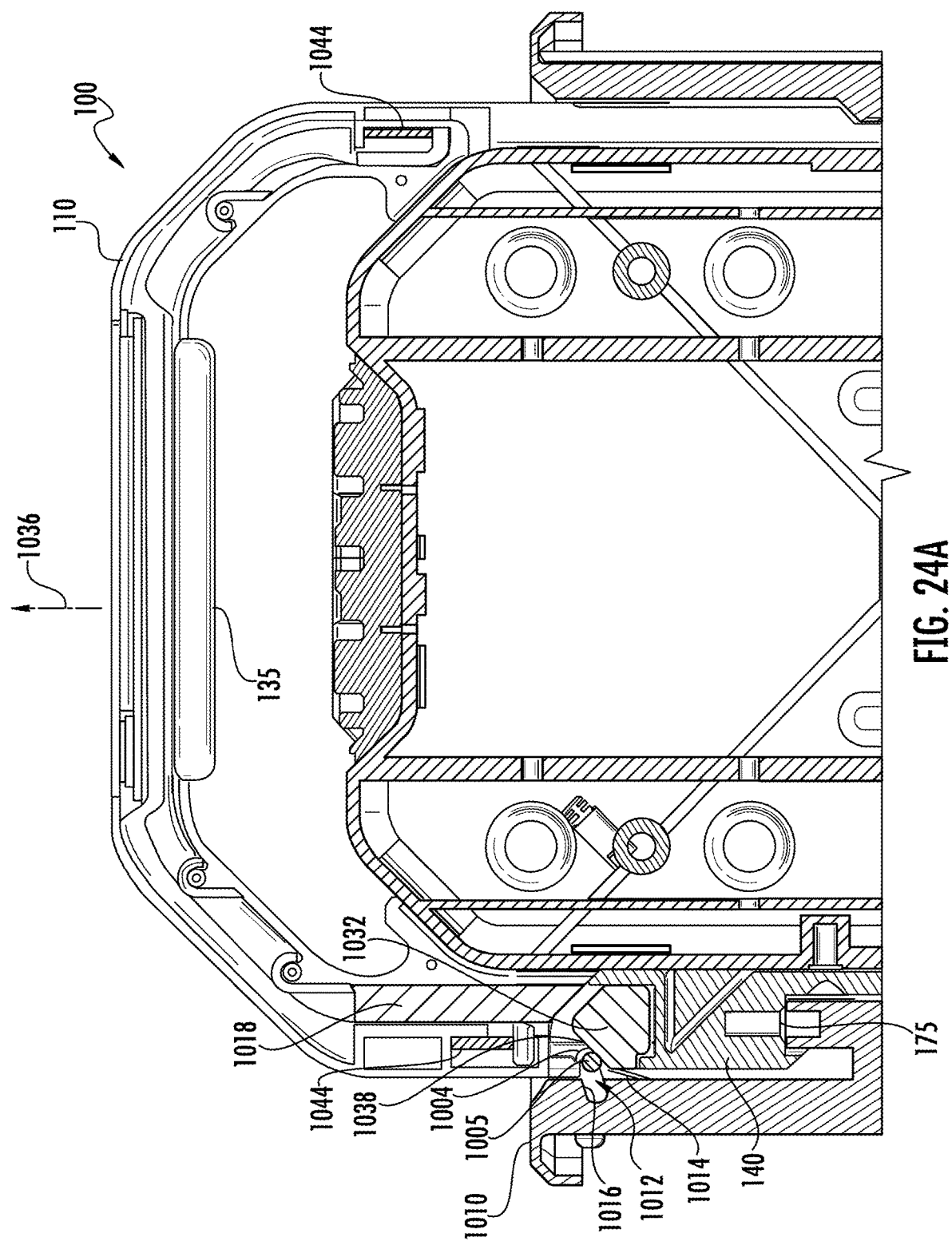
FIG. 24a is a section view of the battery assembly of FIG. 2.

Referring now to FIGS. 24a-24b, a section view of the battery assembly 100 is shown in various modes of battery removal or insertion, according to some embodiments. FIG. 24a shows battery assembly 100 in a configuration prior to removal from receptacle 1010. The configuration shown in FIG. 24a is an engaged state where the mating feature 140 of battery assembly 100 is engaged with receptacle 1010 through snap pin 1005. Protrusion 1032 of release button 1018 is shown engaged with snap pin 1005. In this configuration, battery assembly 100 is latched to receptacle 1010 through the interface between protrusion 1032 of release button 1018 and snap pin 1005. Snap pin 1005 acts as a connection between battery assembly 100 and receptacle 1010 by connecting mating assembly 140 to receptacle 1010 by engaging with channel 1004 of mating feature 140 and slot 1016 of receptacle 1010. Battery assembly 100 also includes extension springs 1044. Extension springs 1044 interface at one end with a protrusion of release button 1018 (see protrusion 1046 in FIG. 20) and at another end with a surface of battery assembly 100 (see surface 1048 in FIG. 20) or with a surface of handle 110. Extension springs 1044 are configured to apply a force to protrusion 1046 of release button 1018. The force applied to protrusion 1046 of release button 1018 by extension springs 1044 acts in an opposite direction of a force required to depress or move release button 1018 in direction 1036. In some embodiments, movable member 135 receives the force required to depress or move release button 1018 in direction 1036. Movable member 135 is integrally formed with release button 1018 according to some embodiments. As release button 1018 moves in direction 1036, extension springs 1044 may compress, resulting in an increased expansive force of extension springs 1044. The expansive force of extension springs 1044 opposes the force applied to moveable member 135 to depress release button 1018.

FIG. 24b shows battery assembly 100 in a configuration after release button 1018 has moved in direction 1036 a certain amount due to actuation of moveable member 135. The configuration shown in FIG. 24b is a disengaged state where the mating feature 140 of battery assembly 100 is disengaged from receptacle 1010 through snap pin 1005, allowing battery assembly 100 to be removed from receptacle 1010 in direction 1036. When release button 1018 moves in direction 1036 (i.e., is depressed), a surface 1038 of release button 1018 moves snap pin 1005 within slot 1012 such that snap pin 1005 does not interface with channel 1004 of mating feature 140. If snap pin 1005 does not interface with channel 1004 of mating feature 140, snap pin 1005 does not connect mating feature 140 to receptacle 1010, and battery assembly 100 may be freely removed from receptacle 1010 in direction 1036. The movement of release button 1018 in direction 1036 moves snap pin 1005 out of engagement with mating feature 140, allowing battery assembly 100 to be removed from receptacle 1010.

When snap pin 1005 moves within slot 1012 to disengage snap pin 1005 from mating feature 140 and allow battery assembly 100 to be removed, spring 1014 deflects due to the interface between first end 1026 of spring 1014 according to some embodiments. Spring 1014 applies a force to snap pin 1005 to bias snap pin 1005 into engagement with mating feature 140. When spring 1014 deflects, the force applied to snap pin 1005 to bias snap pin 1005 into engagement with mating feature 140 increases.

Referring still to FIG. 24b, release button 1018 is shown to include moveable member 135, connecting portions 1019, hooked portion 1025, and protrusion 1032. Release button 1018 extends through substantially an entire length of handle 110, as shown in FIG. 24b. Release button 1018 is configured to be moveable within handle 110 to disengage battery assembly 100 from receptacle 1010. Protrusion 1032 is shown disposed at a first end of release button 1018 and is connected to one of connecting portions 1019. Hooked portion 1025 is disposed at a second end of release button 1018 and is connected to another one of connecting portions 1019. Connecting portions 1019 also include notches 1021, configured to interface with protrusions 1023 of handle 110 when release button 1018 is in the engaged state. Protrusion 1046 of release button 1018 is disposed at the first end of release button 1018 and is configured to interface with one of extension springs 1044. Hooked portion 1025 at the second end of release button 1018 is configured to interface with another one of extension springs 1044. Extension springs 1044 bias release button 1018 into the disengaged state and bias notches 1021 into interfacing with protrusions 1023. Extension springs 1044 bias release button 1018 into the disengaged state by applying force to protrusion 1046 and hooked portion 1025 of release button 1018. In some embodiments, protrusion 1032, connecting portions 1019, hooked portion 1025, and moveable member 135 are integrally formed to form release button 1018. In some embodiments, protrusion 1032, connecting portions 1019, hooked portion 1025, and moveable member 135 are connected (e.g., by fasteners) to form release button 1018.

Figure 25A:
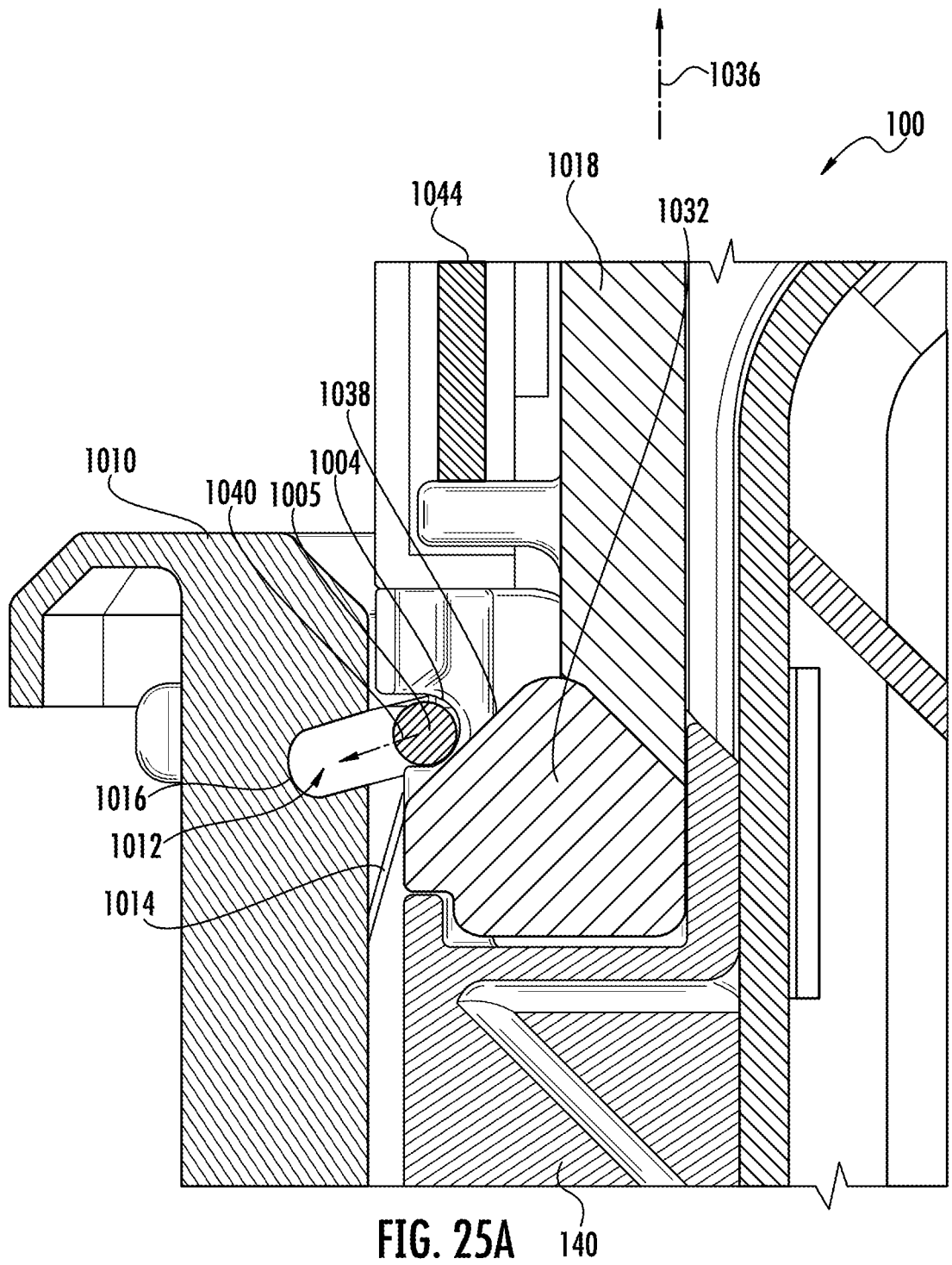
FIG. 25a is a section view of the mating feature of the battery assembly of FIG. 2.
Figure 25B:
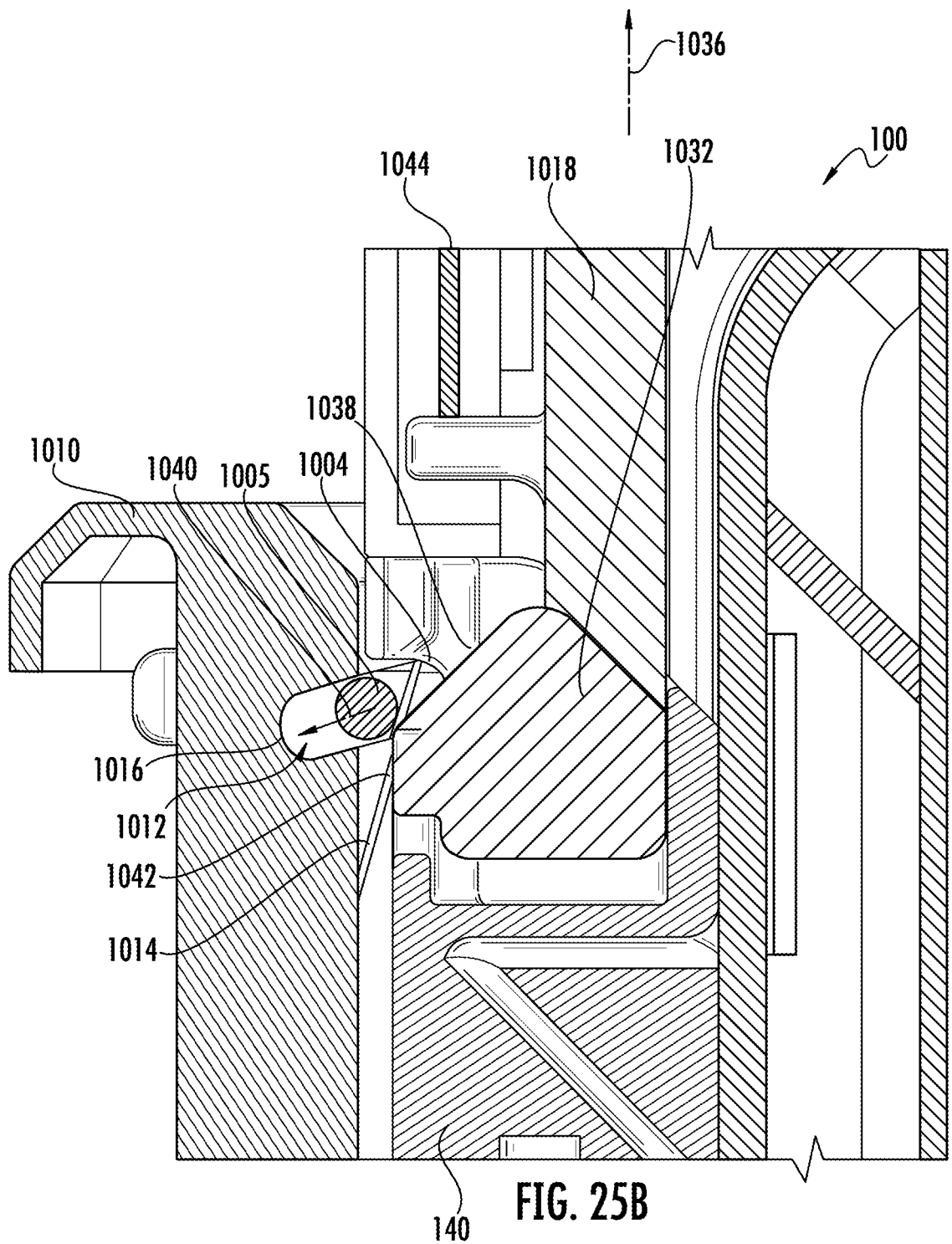
FIG. 25b is a section view of the mating feature of the battery assembly of FIG. 2.
Figure 25C:
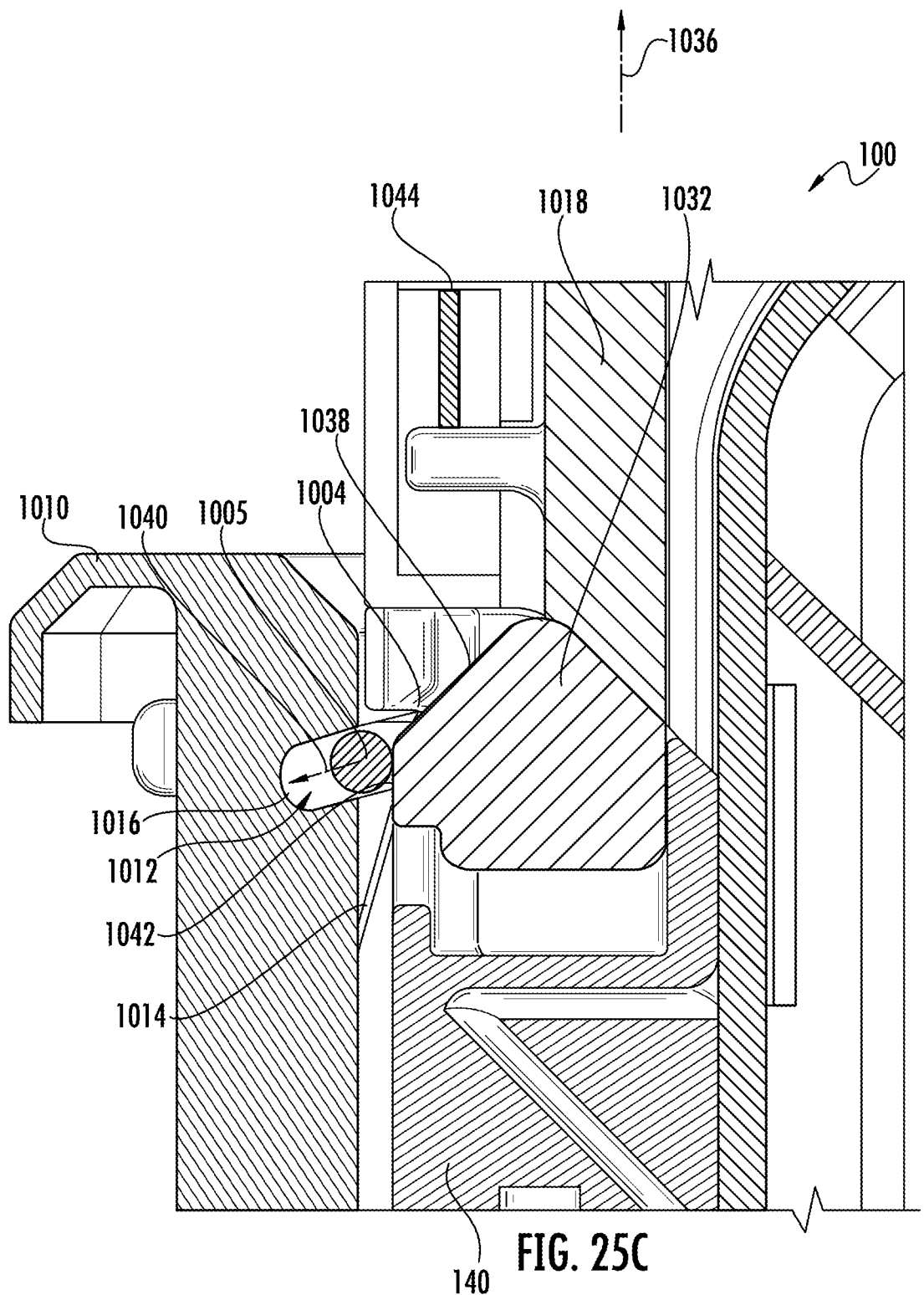
FIG. 25c is a section view of the mating feature of the battery assembly of FIG. 2.

Referring now to FIGS. 25a-c, a sectional view of a portion of mating feature 140 and receptacle 1010 is shown in various configurations. FIG. 25a depicts mating feature 140 engaged with receptacle 1010. FIGS. 25b-c depict various stages of disengagement between mating feature 140 and receptacle 1010. Referring to FIG. 25a, mating feature 140 is shown connected to receptacle 1010. Mating feature 140 is connected to receptacle 1010 through snap pin 1005. Snap pin 1005 engages with both channel 1004 of mating feature 140 and slot 1016 of receptacle 1010.

Referring now to FIG. 25b, snap pin 1005 is shown disengaged from mating feature 140. Release button 1018 moves in direction 1036, and surface 1038 of protrusion 1032 of release button 1018 moves snap pin 1005 into a state where snap pin 1005 is not engaged with mating feature 140 (i.e., snap pin 1005 moves downward and to the right within slot 1012). Surface 1038 is shown angled relative to vertical surface 1042 (see FIG. 25b). Snap pin 1005 may move within slot 1012 in direction 1040 as release button 1018 moves in direction 1036.

Referring now to FIG. 25c, snap pin 1005 is shown moved to complete disengagement with mating feature 140. Release button 1018 is shown moved to a maximum position in direction 1036. When release button 1018 has been fully depressed (i.e., moved to a maximum position in direction 1036), snap pin 1005 is adjacent surface 1042 of protrusion 1032 of release button 1018. In the configuration shown in FIG. 25c, battery assembly 100 can be removed from receptacle 1010 since snap pin 1005 no longer engages mating feature 140 according to some embodiments. Snap pin 1005 rides along vertical surface 1042 of protrusion 1032 as the battery assembly 100 is removed from receptacle 1010.

Figure 26:
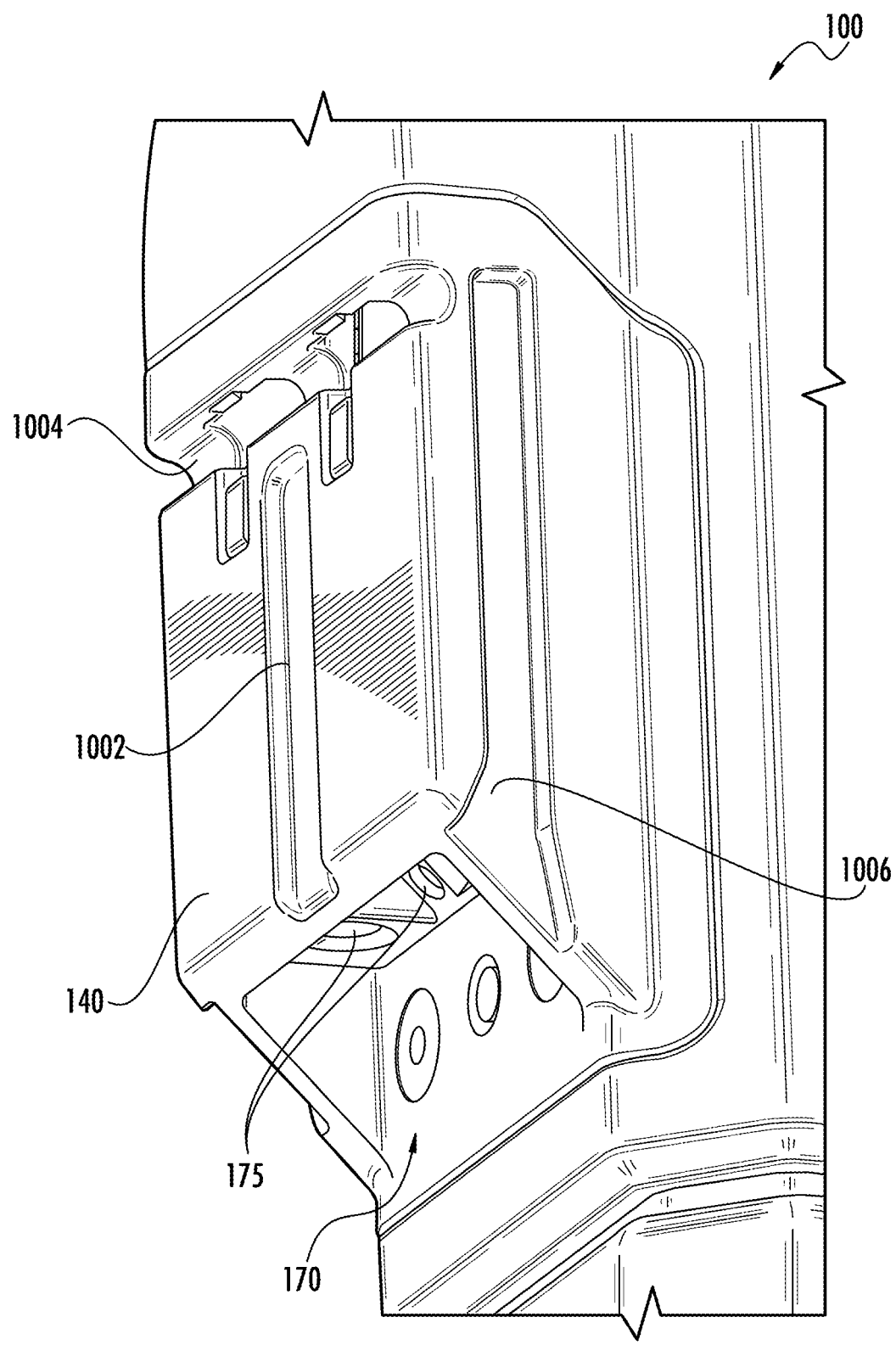
FIG. 26 is a perspective view of the mating feature of the battery assembly of FIG. 2.

Referring now to FIG. 26, a perspective view of mating feature 140 is shown. Mating feature 140 is shown to include side channels 1006, front channel 1002, and channel 1004 according to some embodiments. Channel 1004 is defined by a recession of mating feature 140 and is configured to interface with snap pin 1005. Mating feature 140 may also include opening 170 having one or more ports 175 positioned therein. In some embodiments, mating feature 140 is fixedly connected to battery assembly 100 (e.g., by a fastener). In other embodiments, mating feature 140 is integrally formed with battery assembly 100.

Figure 27:
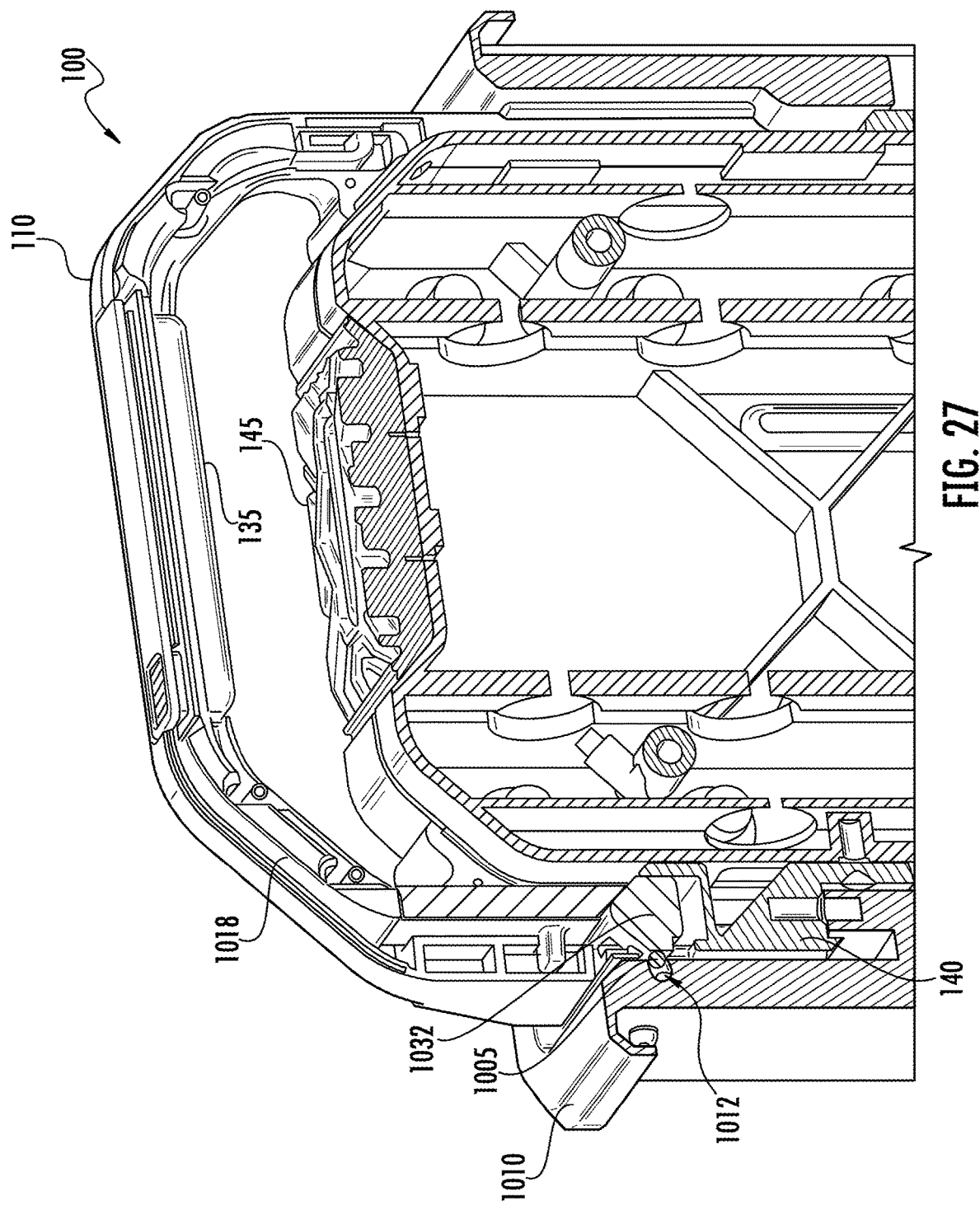
FIG. 27 is a perspective section view of the battery assembly of FIG. 2.

Referring now to FIG. 27, a perspective sectional view of battery assembly 100 is shown. In the configuration shown in FIG. 27 of battery assembly 100, snap pin 1005 is not engaged with mating feature 140 of battery assembly 100. This allows battery assembly 100 to be removed from receptacle 1010, according to some embodiments.

Figure 28:
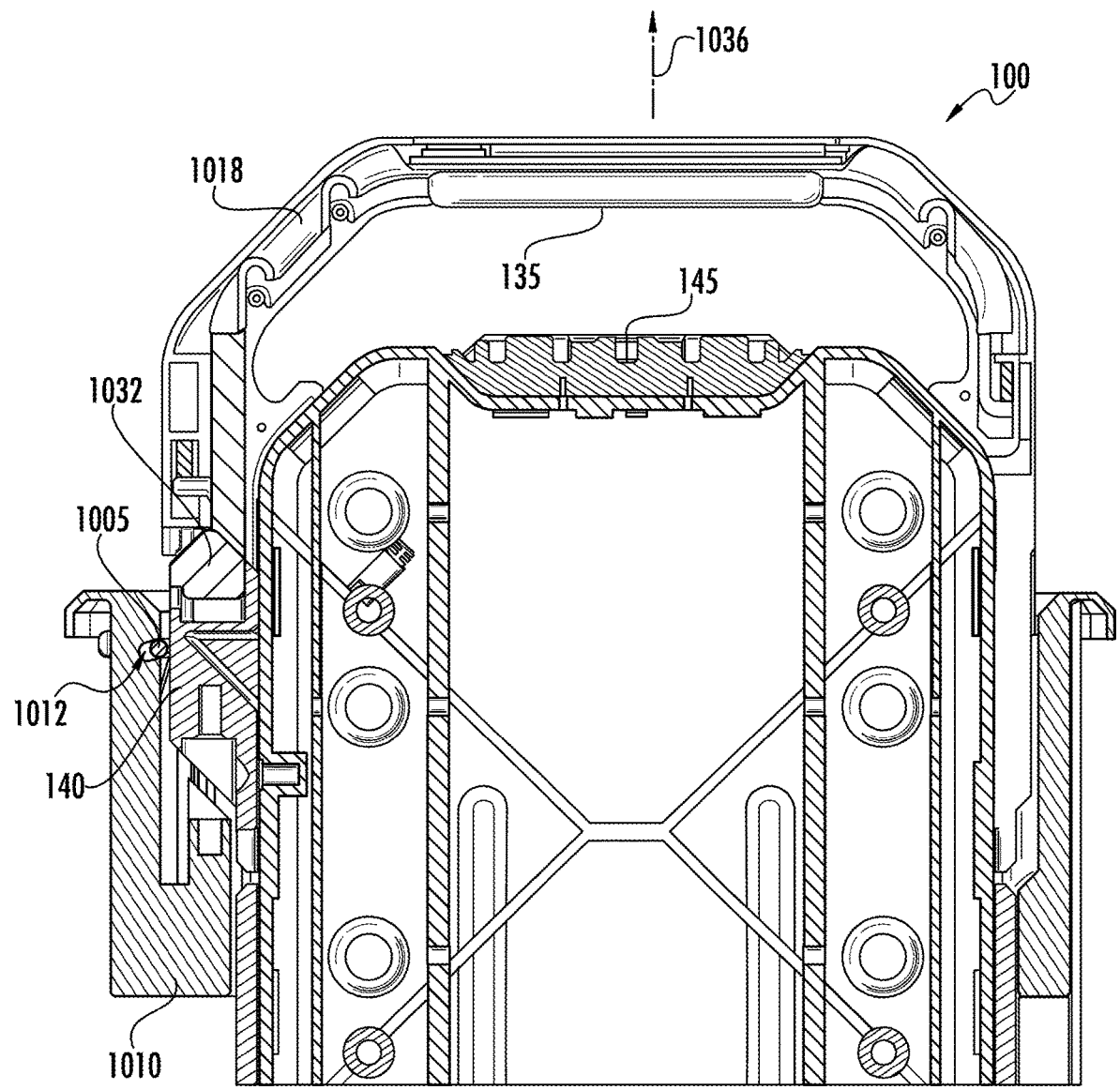
FIG. 28 is a section view of the battery assembly of FIG. 2.
Figure 29:
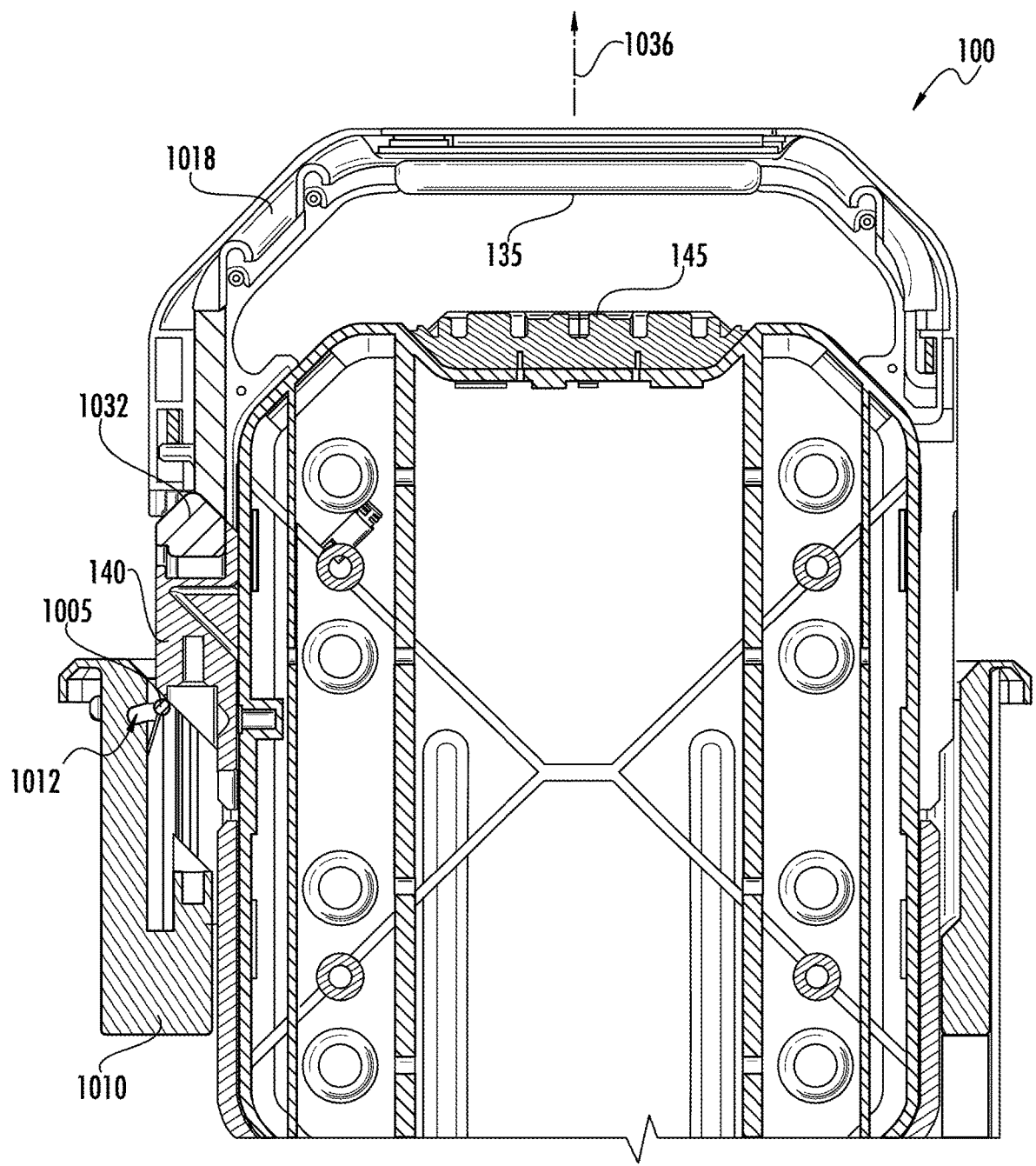
FIG. 29 is a section view of the battery assembly of FIG. 2.
Figure 30:
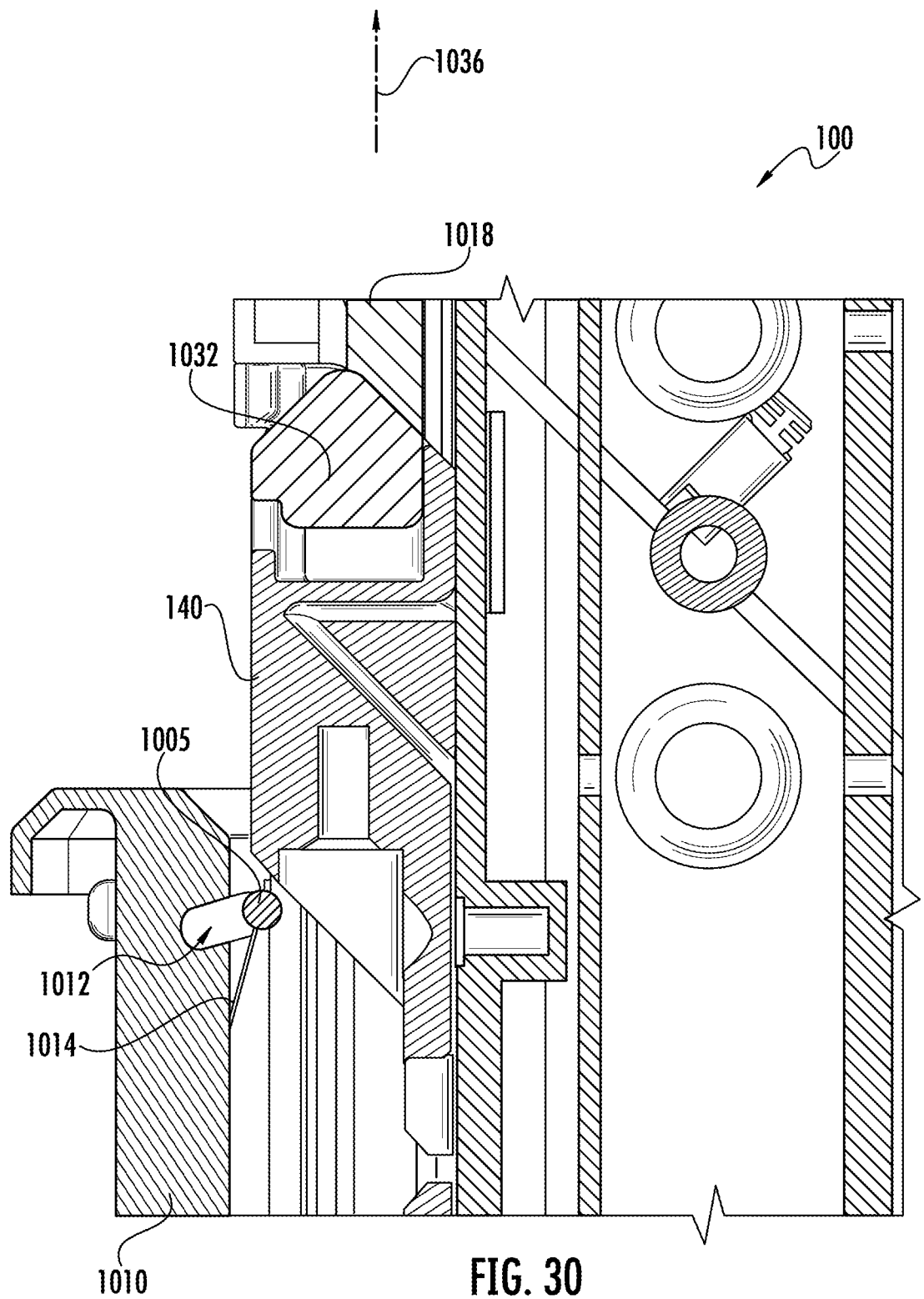
FIG. 30 is a section view of the mating feature of the battery assembly of FIG. 2.

Referring now to FIG. 28-30, a sectional view of battery assembly 100 is shown, with battery assembly 100 being removed from receptacle 1010. Battery assembly 100 may be removed in direction 1036. Battery assembly 100 may be removed in direction 1036 with snap pin 1005 being adjacent to mating feature 140.

Figure 31:
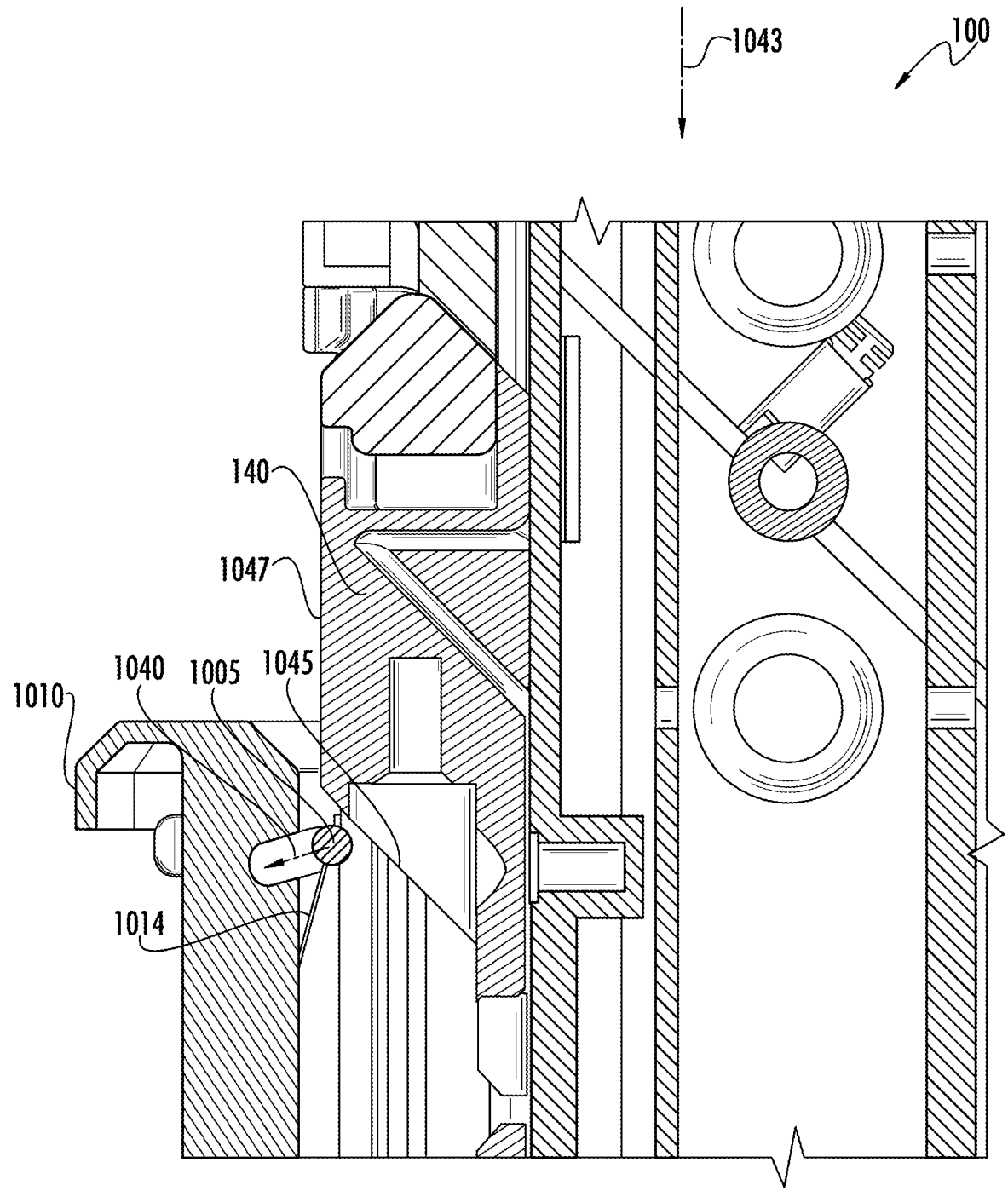
FIG. 31 is a section view of the mating feature of the battery assembly of FIG. 2.

Referring now to FIG. 31, a sectional view of battery assembly 100 while being inserted into receptacle 1010 is shown. Battery assembly 100 may be inserted into receptacle 1010 in direction 1043. As battery assembly 100 is inserted into receptacle 1010 in direction 1043, a ramped surface 1045 of mating feature 140 interfaces with snap pin 1005 and moves snap pin 1005 in direction 1040, according to some embodiments. As battery assembly 100 is inserted into receptacle 1010, snap pin 1005 is adjacent to surface 1047 of mating feature 140. When battery assembly 100 has been fully inserted into receptacle 1010, spring 1014 pushes snap pin 1005 into engagement with channel 1004 of mating feature 140.

Referring generally to the FIGURES, battery assembly 100 may vary in size, weight, height, and capacity according to some embodiments. For example, battery assembly 100 may be 10 inches (25.4 centimeters) in height, 12 inches (30.48 centimeters) in height, 18 inches (45.72 centimeters) in height, etc., according to some embodiments. In some embodiments, battery assembly 100 may be more than 18 inches (45.72 centimeters) in height or may be less than 10 inches (25.4 centimeters) in height. The height of battery assembly 100 may correspond to battery capacity and/or weight according to some embodiments. In some embodiments, battery assembly 100 may have a capacity of 1600 W-hr, 1400 W-hr, 1200 W-hr, etc. In some embodiments, battery assembly 100 may have capacity greater than 1600 W-hr or less than 1200 W-hr. In some embodiments, battery assembly 100 is at least 1 kW-hr. Battery assembly 100 may also have different weights according to some embodiments. In some embodiments, battery assembly 100 may weigh approximately 10 pounds (approximately 4.536 kilograms), 15 pounds (6.804 kilograms), 20 pounds (9.072 kilograms), 25 pounds (11.34 kilograms), etc. In some embodiments, battery assembly 100 may weight more than 25 pounds (11.34 kilograms) or less than 10 pounds (4.536 kilograms). The weight of battery assembly 100 may correspond to the height of battery assembly 100 and/or the capacity of battery assembly 100 according to some embodiments. In a preferred embodiment, a single battery assembly 100 weighing 30 pounds (13.61 kilograms) or less provides at least 5 kW of power at a constant current output. This battery assembly 100 is removable and portable by hand by a single person. This arrangement provides power suitable for use with outdoor power equipment and other power equipment while also being able to be carried, moved, positioned, and otherwise manipulated by a single person. This enables a single person to handle the battery assembly to move it between a charger and the equipment to be powered, move the battery assembly around a jobsite, yard, or home, or otherwise make use of the battery assembly in a convenient manner. At the same time, the battery assembly provides ample power at a constant current output to power various types of equipment. In combination, this provides the user with a portable power supply that can be moved, carried, handled, or otherwise used by a single person and that is able to power equipment in a manner similar to that provided by conventional gas powered equipment.

In some embodiments, the size, weight, height, and capacity of battery assembly 100 may vary depending on the application of battery assembly 100. For example, battery assembly 100 may be used with handheld or backpack power equipment according to some embodiments. In some embodiments, battery assembly 100 may be used to connect to a backpack receptacle (e.g., a backpack leaf blower). If battery assembly 100 is intended for use with the backpack receptacle, certain sizes and weights of battery assembly 100 may be preferred. For example, it may be preferred for battery assembly 100 to weigh less than 15 pounds (6.804 kilograms) if battery assembly 100 is intended for use in the backpack receptacle. In some embodiments, it may be preferred that battery assembly 100 weighs less than 20 pounds (9.072 kilograms) if battery assembly 100 is intended for use in the backpack receptacle. In some embodiments, the capacity of battery assembly 100 must be reduced to achieve lower weight.

Figure 32:
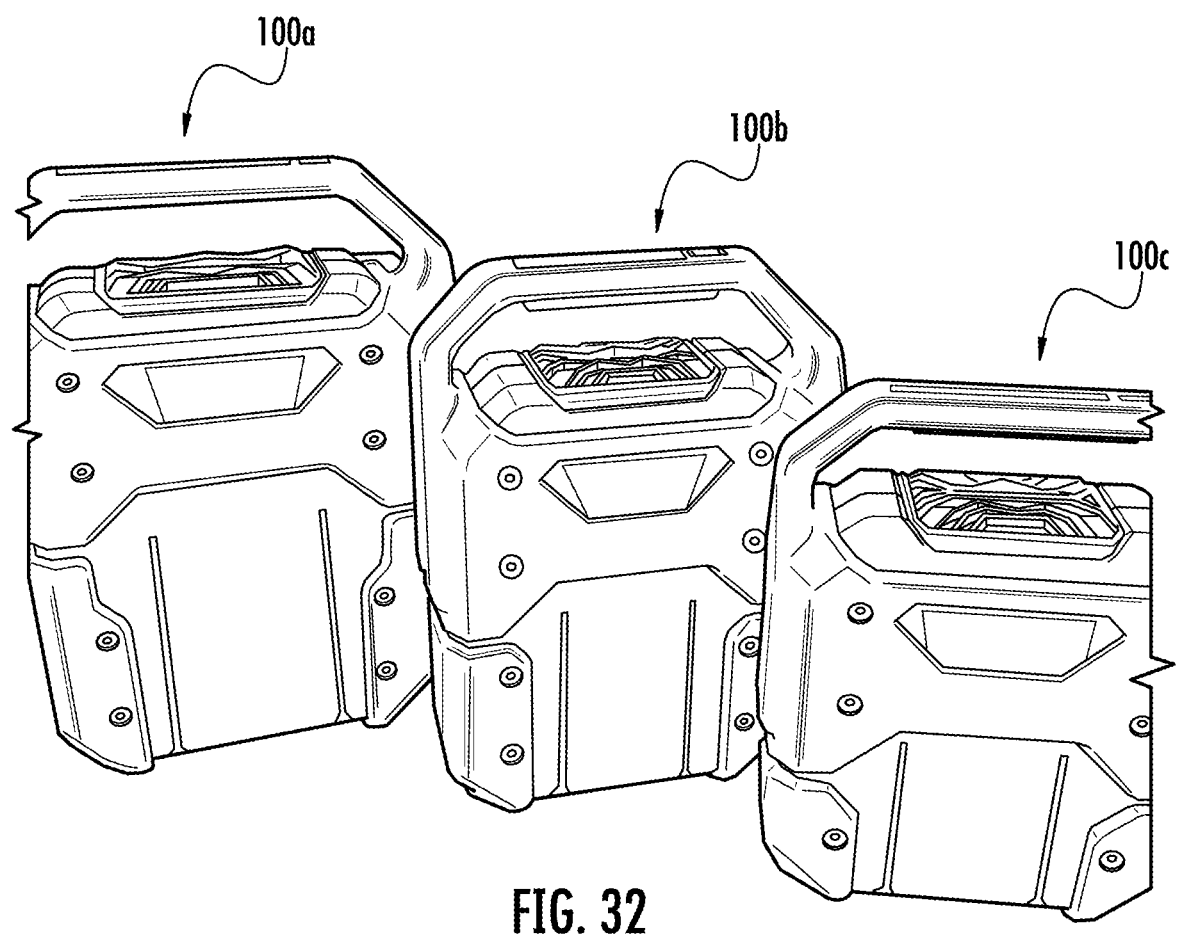
FIG. 32 is a perspective view of various embodiments of the battery assembly of FIG. 2.

Referring now to FIG. 32, several embodiments of battery assembly 100 are shown according to some embodiments. Battery assembly 100 may be different heights as shown in FIG. 32 according to some embodiments. In some embodiments, the height of battery assembly 100 may correspond to different battery capacities. For example, battery assembly 100a is shown as being taller than battery assembly 100b and battery assembly 100c. Battery assembly 100a may have more energy capacity as compared to battery assembly 100b and battery assembly 100c. For example, battery assembly 100a may have a capacity of 1600 W-hr, battery assembly 100b may have a capacity of 1400 W-hr, and battery assembly 100c may have a capacity of 1200 W-hr. In some embodiments, the height and capacity of battery assemblies 100a-c may also correspond to weight. For example, battery assembly 100a may be 30 pounds (13.61 kilograms), battery assembly 100b may be 25 pounds (11.34 kilograms), and battery assembly 100c may be 20 pounds (9.072 kilograms) according to some embodiments. In some embodiments, each of battery assemblies 100a-c may be less than 25 pounds (11.34 kilograms) to provide easy transportation. In some embodiments, battery assembly 100 may vary in size, weight, or capacity based on the intended use of battery assembly 100. For example, if battery assembly 100 is intended to be used for lawnmowers, battery assembly 100 may have a particular size, weight, and capacity, while if battery assembly 100 is intended to be used for a different applications (e.g., a power rake), battery assembly 100 may have a different size, weight, and capacity.

Battery assembly 100 may be used for a variety of applications according to some embodiments. For example, battery assembly 100 may be used with a floor burnisher, a power rake, a mower, a portable air conditioner, a light tower, a spreader, a sprayer, a seeder, etc., or any other power equipment.

Figure 33:
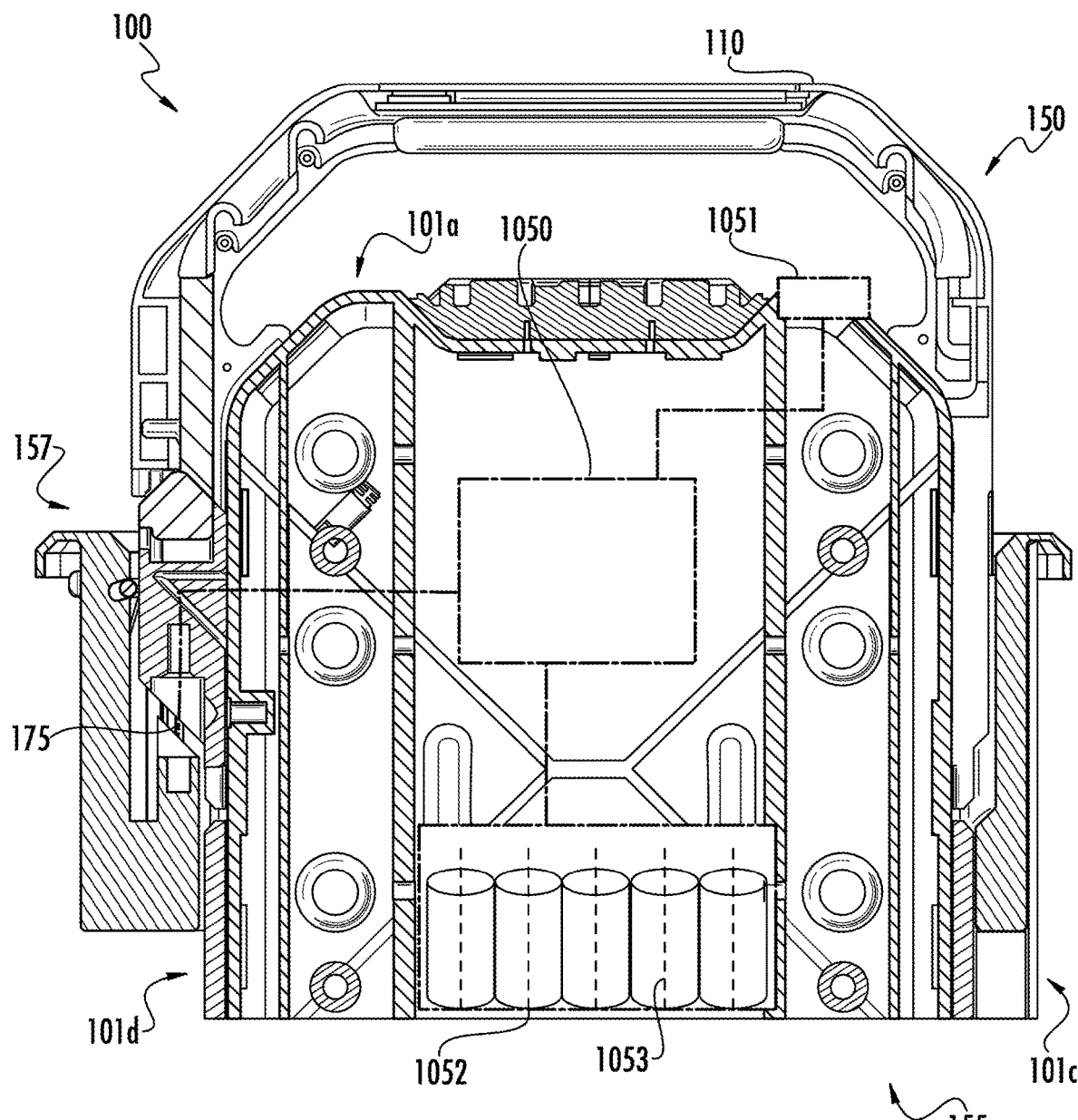
FIG. 33 is a section view of the battery assembly of FIG. 2, showing a controller.

Referring now to FIG. 33, battery assembly 100 is shown to include a controller 1050 and battery cells 1052. The battery cells 1052 collectively form a battery pack, (e.g., battery pack 105). Battery cells 1052 are shown oriented vertically (i.e., each battery cell has an axis 1053 extending longitudinally through an entire length of each of battery cells 1052 normal to a cross sectional area of each of battery cells 1052 and vertically oriented). Battery cells 1052 may be stacked to increase or decrease an electrical capacity of battery assembly 100, according to various embodiments. In some embodiments, battery cells 1052 are horizontally oriented (i.e., the axis 1053 of each battery cell is horizontally oriented). The horizontal or vertical orientation of battery cells 1052 may require different dimensions of battery assembly 100 to house the battery cells 1052. For example, if battery cells 1052 are horizontally oriented, battery assembly 100 may be wider than a battery assembly 100 with vertically oriented battery cells 1052. In some embodiments, vertical orientation of battery cells 1052 is defined by axis 1053 of each battery cell extending through upper portion 150 and/or top face 101a and/or bottom face 101f. In some embodiments, vertical orientation of battery cells 1052 is defined by axis 1053 of each battery cell being substantially perpendicular to at least one of right side 101d and left side 101c. In some embodiments, vertical orientation of battery cells 1052 is defined by axis 1053 of each battery cell extending through lower portion 155 and/or bottom face 101f. In some embodiments, horizontal orientation of battery cells 1052 is defined by axis 1053 of each battery cell being substantially parallel to at least one of top face 101a and bottom face 101f. In some embodiments, horizontal orientation of battery cells 1052 is defined by axis 1053 of each battery cell extending through side portion 157 and/or left side 101c and/or right side 101d. In some embodiments, battery cells 1052 may be stacked in either a horizontal or vertical orientation above ports 175. Stacking battery cells 1052 above ports 175 may increase the electrical capacity of battery assembly 100 (due to the added battery cells 1052); however, an overall height of battery assembly 100 may be increased to provide housing space for the additionally stacked battery cells 1052. This added overall height may increase a distance between ports 175 and handle 110. In some embodiments, the orientation of battery cells 1052 and the quantity (e.g., stack height) of battery cells 1052 may result in different dimensions of battery assembly 100 to house the battery cells 1052 (i.e., an increased number of battery cells 1052 may result in a larger required volume to house battery cells 1052, and the horizontal or vertical orientation of battery cells 1052 may result in different dimensions of battery assembly 100 to house battery cells 1052). In some embodiments, controller 1050 may be configured to interface with battery cells 1052 and may control power output of battery cells 1052. Controller 1050 may be configured to allow battery cells 1052 to allow full power output to ports 175 to supply power to power equipment which battery assembly 100 is connected to, according to some embodiments. In some embodiments, controller 1050 may allow battery cells 1052 to be charged when battery assembly 100 is connected to charging stations. Controller 1050 may also be configured to shut off power output from battery cells 1052 to ports 175, according to some embodiments. In some embodiments, controller 1050 may also be configured to record and store data regarding usage, cycles, power level, rental duration, etc., of battery assembly 100. Controller 1050 may also be configured to connect via the data port 177 and/or wirelessly connect to a remote database, a remote network, or a remote device, according to some embodiments. In some embodiments, controller 1050 may further be configured to control user interface 1051. User interface 1051 may display information to the user, such as battery level, rental time remaining, error messages, etc.

Figure 34:
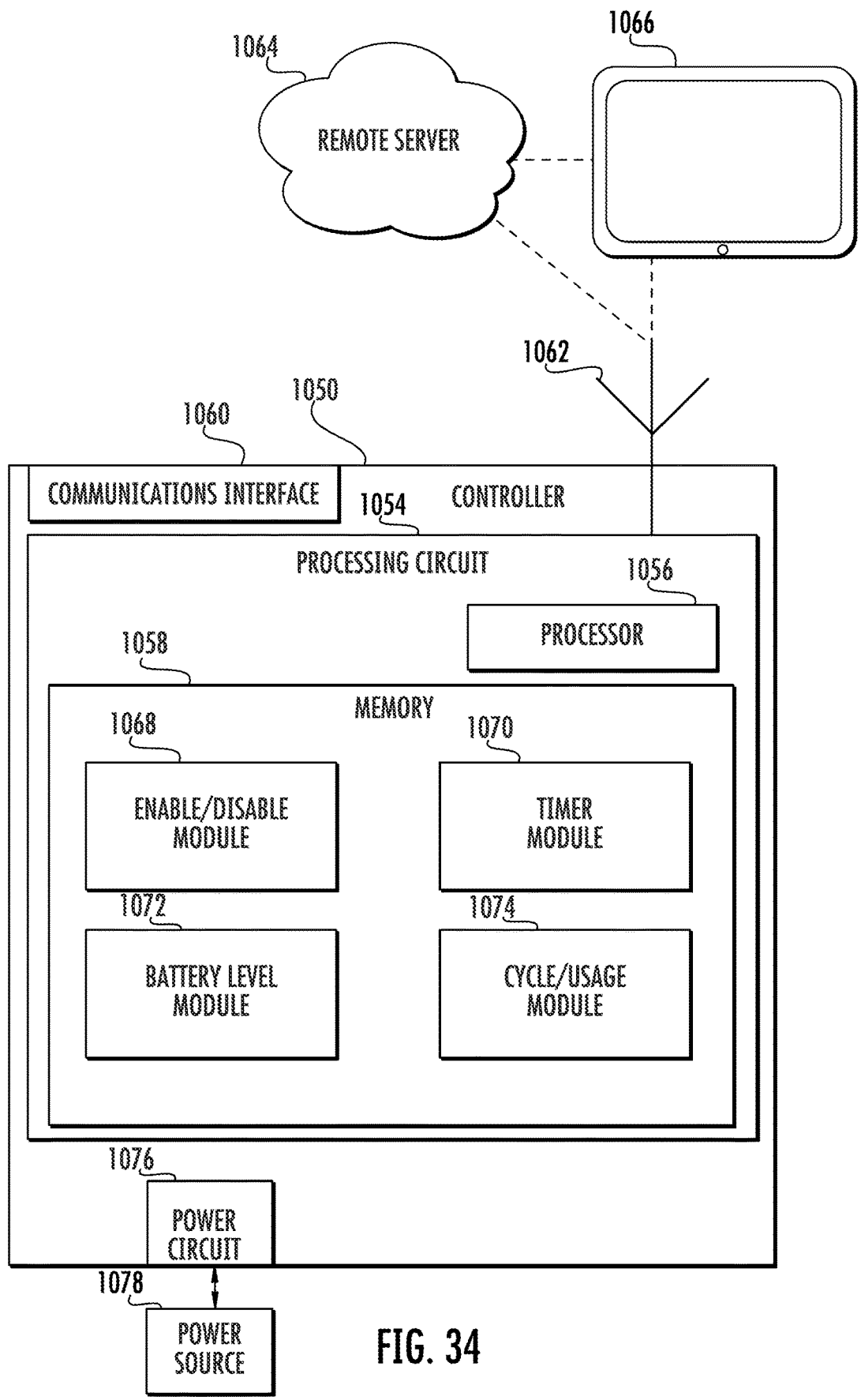
FIG. 34 is a block diagram of the controller of FIG. 33.

Referring now to FIG. 34, a block diagram of controller 1050 is shown according to some embodiments. Controller 1050 is shown to include processing circuit 1054, processor 1056, and memory device 1058 according to some embodiments. Controller 1050 is coupled tot the data port 177 to enable data communication to and from the controller 1050 via the data port 177. In some embodiments, controller 1050 includes a wireless transceiver 1062. Wireless transceiver 1062 may be configured to communicably connect controller 1050 to a remote server 1064, and/or a personal computer device 1066. Personal computer device 1066 can be any type of user computing device. Personal computer device 1066 can be a smartphone, a laptop, a technician device, tablet device, and/or any other computing device. Data or information exchange between the controller 1050 and one or more devices external to the battery assembly 100 as described herein can be achieved wireless or through a wired connection made via the data port 177 or through a combination of wirelessly and wired.

The controller 1050 is shown to include processing circuit 1054. The processing circuit 1054 is shown to include processor 1056 and a memory 1058. While the controller 1050 is shown to include one processing circuit 1054, it should be understood that the controller 1050 can include any number of processing circuits 1054 and/or the functionality of the processing circuit 1054 can be distributed across multiple processing circuits (e.g., across multiple integrated circuits).

The processor 1056 can be implemented as a general purpose processor, an application specific integrated circuit (ASIC), one or more field programmable gate arrays (FPGAs), a group of processing components, or other suitable electronic processing components. The memory device 1058 (e.g., memory, memory unit, storage device, etc.) is one or more devices (e.g., RAM, ROM, Flash memory, hard disk storage, etc.) for storing data and/or computer code for completing or facilitating the various processes, layers and modules described in the present application. The memory device 1058 may be or include volatile memory or non-volatile memory. The memory device 1058 may include database components, object code components, script components, or any other type of information structure for supporting the various activities and information structures described in the present application. According to an exemplary embodiment, the memory device 1058 is communicably connected to the processor 1056 via the processing circuit 1054 and includes computer code for executing (e.g., by processing circuit and/or processor) one or more processes described herein.

Controller 1050 is shown to include a power circuit 1076, according to some embodiments. Power circuit 1076 can include one or more circuits configured to power the controller 1050. For example, the power circuit 1076 can include one or more transformers, rectifiers, filters, voltage regulators, etc. configured to power the controller 1050 via a power source 1078. The power source 1078 may be a battery, for example, a battery that is the same as and/or separate from (but can be similar to) the battery cells 1052. The power circuit 1076 can include one or more connectors for connecting to the power source 1078.

The wireless transceiver 1062 can be configured to communicate and/or manage a wireless network (e.g., a Bluetooth network, a Zigbee network, a Wi-Fi network, a cellular network (e.g., 3G, LTE, etc.). In this regard, the controller 1050 can be enabled to communicate with various Internet servers (e.g., remote server 1064), or personal computer device 1066 (e.g., a smartphone, tablet, laptop computer, etc.).

Referring still to FIG. 34, controller 1050 is shown to include communications interface 1060, according to some embodiments. Communications interface 1060 is interface to communicable connect controller 1050 to an external device via the data port 177. For example, communications interface 1060 may allow controller 1050 to serially communicate with the external device via SPI (serial peripheral interface), I2C (inter-integrated circuit), USB (universal serial bus), etc., or other communications protocol. In some embodiments, the external device which controller 1050 communicates with is a charging stations (e.g., rack charger system 200 as shown in FIG. 6). Controller 1050 may communicate with the charging station information regarding a status of battery assembly 100 (e.g., currently charging, fully charged, ready to use, reserved, etc.), according to some embodiments. The charging station may communicate information which controller 1050 collected during a previous rental period with controller 1050 through communications interface 1060. Prior to a rental period, the charging station may communicate information to the controller 1050 regarding the upcoming rental period (e.g., duration of rental period, etc.). Controller 1050 may store this information and use the information during the upcoming rental period.

Controller 1050 is shown to include an enable/disable module 1068, a timer module 1070, a battery level module 1072, and a cycle/usage module 1074, according to some embodiments. Enable/disable module 1068 may be configured to allow or disallow power to leave or enter battery assembly 100 to provide power to power equipment, or to allow battery assembly 100 to be charged. In some embodiments, enable/disable module 1068 may be configured to be communicably connected to remote server 1064 or personal computer device 1066 through wireless transceiver 1062. The remote server 1064 may receive information from controller 1050 regarding the status of enable/disable module 1068 (e.g., information indicating whether or not controller 1050 is allowing power equipment to receive power from battery cells 1052), or may send commands to controller 1050 according to some embodiments. The command received by controller 1050 may be a command to disable the battery cells 1052 from outputting power to power equipment through ports 175. Enable/disable module 1068 may process the command and may disable battery cells 1052 from providing power to ports 175 according to some embodiments. Enable/disable module 1068 may allow or disallow battery cells 1052 to provide power to power equipment through ports 175 based on processes of timer module 1070, battery level module 1072, and/or cycle/usage module 1074. For example, timer module 1070 may communicate with enable/disable module 1068 and may send a command to enable/disable module 1068 to disallow battery cells 1052 to provide power through ports 175, according to some embodiments.

Referring still to FIG. 34, controller 1050 is shown to include timer module 1070, according to some embodiments. Timer module 1070 may be configured to track and store a quantity of time that battery assembly 100 has been rented for, according to some embodiments. For example, when communication between the charging rack and controller 1050 ceases, timer module 1070 may begin timing the duration of the rental period. When communication between the charging rack and controller 1050 ceases, timer module 1070 may begin a countdown time. When the countdown time has completed, timer module 1070 may communicate with enable/disable module 1068 and send a command to enable/disable module 1068 to disallow battery cells 1052 to provide power through ports 175.

In some embodiments, controller 1050 may communicate information regarding timer module 1070 to remote server 1064 or to personal computer device 1066 through wireless transceiver 1062. For example, controller 1050 may communicate information to remote server 1064 or personal computer device 1066 that a specific amount of time remains in a current rental period. In some embodiments, controller 1050 may receive a command through wireless transceiver 1062 from remote server 1064 or personal computer device 1066 to increase the amount of time remaining in the current rental period (i.e., if a customer using battery assembly 100 has requested additional time). Timer module 1070 may increase the amount of time remaining in the rental period, and may enable battery cells 1052 to provide power through ports 175 for duration of the increased rental period according to some embodiments.

Referring still to FIG. 34, controller 1050 is shown to include battery level module 1072, according to some embodiments. Battery level module 1072 may monitor a status of battery cells 1052, (e.g., remaining charge, state of charge, state of health, etc.). Battery level module 1072 may be configured to communicate with user interface 1051 to display to a user the amount of charge remaining in battery cells 1052, according to some embodiments. Battery level module 1072 may be configured to determine a remaining amount of operational time of battery cells 1052, and may display the remaining amount of operational time of battery cells 1052 to the user via user interface 1051. If battery assembly 100 has fallen below a certain state of health, battery assembly 100 may be reserved for lower-load equipment. Advantageously, this may increase the productive use of battery assembly 100 and may enable the battery rental company to continue using battery assembly 100 even after it is not suited for high-load applications.

In some embodiments, when controller 1050 establishes communication with the charging station, battery level module 1072 may determine an amount of time remaining until the battery assembly 100 is fully charged and may display the amount of time remaining until the battery assembly 100 is fully charged via user interface 1051. In some embodiments, when controller 1050 is connected to the charging station, controller 1050 may receive a rental request. If battery assembly 100 is fully charged, as determined by battery level module 1072, controller 1050 may indicate that battery assembly 100 is ready for rental via user interface 1051. For example, if a customer requests to rent battery assembly 100, the user may receive a unique code. Battery assembly 100 may receive, through communications interface 1060, the unique code, and when battery assembly 100 is fully charged, as determined by battery level module 1072, controller 1050 may display the unique code to the user via user interface 1051, according to some embodiments. This may notify the user the particular battery pack which has been reserved for the user. In some embodiments, the battery assembly 100 only indicates via the user interface 1051 that the battery assembly 100 is ready for rental when the battery assembly 100 is unreserved and fully charged.

Referring still to FIG. 34, controller 1050 is shown to include cycle/usage module 1074, according to some embodiments. Cycle/usage module 1074 may monitor the usage and cycle (i.e., the number of recharges of battery assembly 100). In some embodiments, cycle/usage module 1074 may monitor a current and voltage output of battery assembly 100 through ports 175. In some embodiments, cycle/usage module 1074 may monitor a real, reactive, and apparent power output through ports 175. Cycle/usage module 1074 may also track and store a count of times battery assembly 100 has been charged, according to some embodiments. For example, every time battery assembly 100 is connected to the charging station, cycle/usage module 1074 may increase the count by one. In some embodiments, cycle/usage module 1074 may only increase the count when the remaining charge of battery cells 1052 has gone below a low threshold value, and has exceeded a high threshold value. If battery assembly 100 has exceeded a certain amount of charges, battery cells 1052 may degrade, and battery assembly 100 may be reserved for lower-load equipment. Advantageously, this may increase the productive use of battery assembly 100 and may enable the battery rental company to continue using battery assembly 100 even after it is not suited for high-load applications.

Any of enable/disable module 1068, timer module 1070, battery level module 1072, and cycle/usage module 1074 may communicate with remote server 1064 and/or personal computer device 1066, according to some embodiments. In some embodiments, any of enable/disable module 1068, timer module 1070, battery level module 1072, and cycle/usage module 1074 may send data to remote server 1064 and/or personal computer device 1066 regarding a specific operation or information relevant to each module. For example, battery level module 1072 may send information regarding the current state of charge of battery cells 1052 to the remote server 1064 and/or personal computer device 1066. In some embodiments, remote server 1064 may store any of the information received from enable/disable module 1068, timer module 1070, battery level module 1072, and cycle/usage module 1074 in a remote database. The remote database and the stored data may be retrieved by personal computer device 1066, according to some embodiments. Controller 1050 may be configured to continuously transmit information to remote server 1064 after a time interval. For example, controller 1050 may transmit information to remote server 1064 every ten minutes, every hour, every half hour, etc. In some embodiments, controller 1050 may receive an information request from remote server 1064, or personal computer device 1066, and may transmit any requested information to the remote server 1064 and/or personal computer device 1066 based on the information request.

Any of enable/disable module 1068, timer module 1070, battery level module 1072, and cycle/usage module 1074 may communicate with each other via processing circuit 1054 to receive/send any information or data necessary to complete each of the processes of enable/disable module 1068, timer module 1070, battery level module 1072, and cycle/usage module 1074, according to some embodiments. For example, cycle/usage module 1074 may need to communicate with battery level module 1072 in order to determine if battery assembly 100 is being charged.

In some embodiments, a Global Positioning System (GPS) Device may be included in controller 1050. In some embodiments, the GPS device may be connected to controller 1050 as an external device through communications interface 1060. Controller 1050 may enable the GPS device to connect to the remote server 1064, or the personal computer device 1066, and may be used to track a location of battery assembly 100, according to some embodiments.

In some embodiments, controller 1050 may include a unique identification number or value. For example, when controller 1050 transmits information to remote server 1064 regarding an operation of one of enable/disable module 1068, timer module 1070, battery level module 1072, and cycle/usage module 1074, controller 1050 may also transmit the unique identification number of battery assembly 100, according to some embodiments. When the information on remote server 1064 is accessed (e.g., by personal computer device 1066), the corresponding unique identification number or value may also be provided by remote server 1064.

Referring again to FIG. 6, rack charging system 200 is shown, according to some embodiments. Rack charging system 200 is shown configured to receive battery assembly 100 in the embodiment shown in FIGS. 18-33. In some embodiments, rack charging system 200 is configured to receive various embodiments of battery assembly 100 where the orientation and position of mating feature 140 differs from the orientation and position of mating feature 140 as shown in the embodiment of FIGS. 18-33. Rack charging system 200 may be configured to receive any of the embodiments of battery assembly 100 described in greater detail above with reference to FIGS. 18-19. For example, in the embodiment shown in FIG. 6, rack charging system 200 is configured to receive battery assemblies 100 configured (through the position and orientation of mating feature 140) to be horizontally inserted into a receptacle. In some embodiments, battery assembly 100 may be configured to be inserted into a receptacle of power equipment at a horizontal orientation, similar to the orientation shown in FIG. 6. In some embodiments, rack charging system 200 is configured to receive battery assemblies 100 configured (through the position and orientation of mating feature 140) to be vertically inserted into a receptacle. In some embodiments, rack charging system 200 may be expanded to connect to more battery assemblies 100. In some embodiments, rack charging system 200 may include a bus which each of battery assemblies 100 connect to. The bus may allow additional rack charging systems to be connected to the rack charging system 200 shown in FIG. 6 in order to increase an amount of battery assemblies 100 which may be charged.

Referring still to FIG. 6, rack charging system 200 may include a security lock to selectively connect battery assemblies 100 to rack charging system 200. The security lock may lock battery assemblies 100 to rack charging system 200 when battery assemblies 100 are not reserved for rental. When a particular battery assembly 100 is reserved for rental, rack charging system 200 may be configured to unlock the particular battery assembly 100 such that a user who rented the particular battery assembly 100 may remove the particular battery assembly 100. In some embodiments, rack charging system 200 may unlock the particular battery assembly 100 based on a command from a technician. For example, when the user who reserved the particular battery assembly 100 for rental arrives, the technician may send a command to the rack charging system 200 to unlock the specific battery assembly 100 from the rack charging system. In some embodiments, rack charging system 200 may serially or wirelessly communicate with a technician user interface, from which the technician may send the command to unlock the particular battery assembly 100.

In some embodiments, rack charging system 200 may be configured to implement different charging schemes. For example, rack charging system 200 may be configured to charge the battery assemblies 100 based on a first in first out charging scheme. In the first in first out charging scheme, rack charging system 200 may be configured to charge the battery assemblies 100 sequentially such that a battery assembly 100 which is connected first to rack charging system 200 is charged first. When the first battery assembly 100 is fully charged, rack charging system 200 may then begin charging a battery assembly 100 which was connected after the first battery assembly 100.

In some embodiments, rack charging system 200 may implement a charging scheme based on a state of charge of battery assemblies 100. For example, a battery assembly 100 with a lowest state of charge may be charged first, according to some embodiments. In some embodiments, rack charging system 200 may determine which battery assembly 100 will finish charging first (based on the state of charge of battery assembly 100, and a capacity of battery assembly 100), and may charge the battery assembly 100 which will finish charging first.

In some embodiments, rack charging system 200 may implement a parallel charging scheme. For example, rack charging system 200 may charge all of battery assemblies 100 parallely, and may disconnect from charging battery assemblies 100 which have reached a full state of charge. While a battery assembly 100 which reaches a full state of charge may be disconnected from being charged by rack charging system 200, the battery assembly 100 may still be locked in the rack charging system 200.

Figure 35:
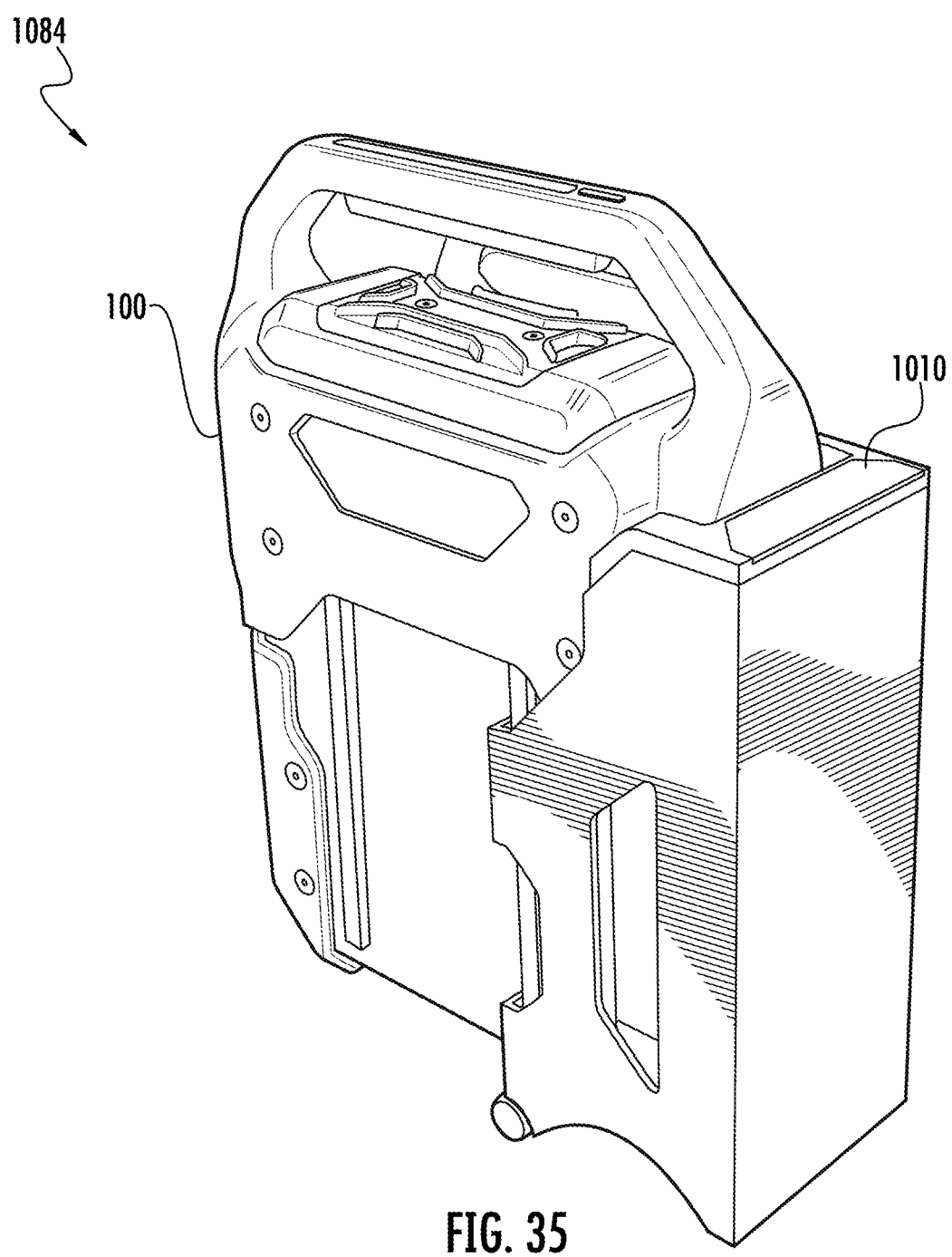
FIG. 35 is a perspective view of a removable receptacle configured to electrically interface with the battery assembly of FIG. 2.
Figure 36:
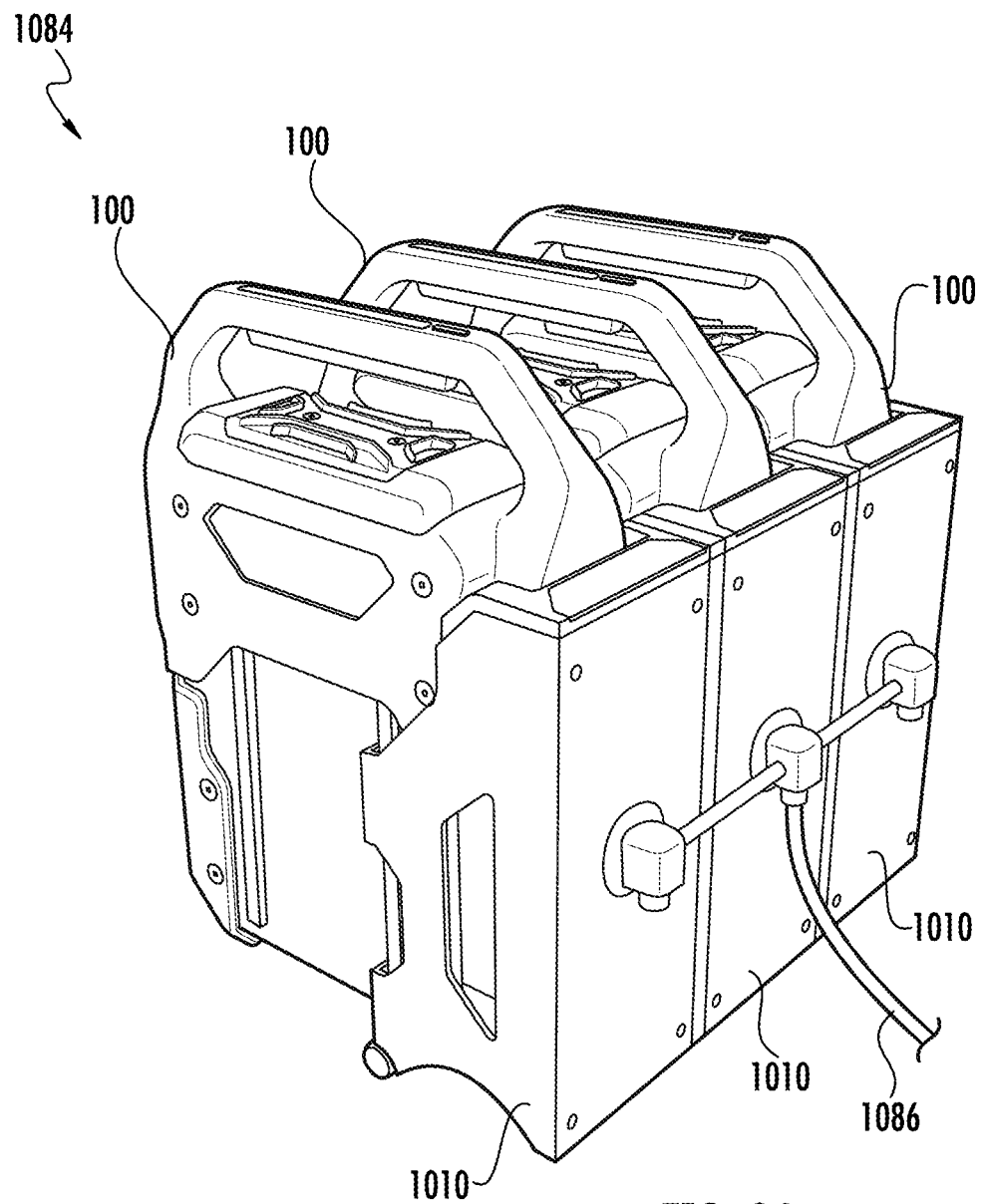
FIG. 36 is a rear view of power equipment including the removable receptacle of FIG. 35.

Referring now to FIGS. 35-36, a battery system 1084 is shown, according to some embodiments. Battery system 1084 is shown to include battery assembly 100 and receptacle 1010. In some embodiments, receptacle 1010 may be a product separate from a piece of equipment (e.g., a lawnmower, a floor polisher, etc., or any of the power equipment disclosed in the present disclosure). Receptacle 1010 includes terminals, configured to electrically connect with ports 175 of mating feature 140 of battery assembly 100. In some embodiments, the terminals of receptacle 1010 and ports 175 of battery assembly 100 also communicably connect. The receptacle 1010 may connected to power equipment via removable fasteners (e.g., bolts, screws, etc.). The receptacle 1010 may be provided to an original equipment manufacturer (OEM) for use in any power equipment application and may facilitate electrical connection between a battery assembly 100 and the power equipment (e.g., lawn mower 1080) so that the battery assembly 100 can be used to provided electrical power to the equipment. Advantageously, this gives the battery assembly manufacturer the ability to control the use of their battery assemblies 100 and to ensure that the battery assembly 100 will not be used in a receptacle 1010 that it is not suited for. Another advantage of the battery system 1084 described herein is it provides the manufacturer greater ability to control the use of its battery assemblies 100 and their application. For example, the battery assembly manufacturer can provide other manufacturers with receptacle 1010 configured to connect to power equipment. For example, the other manufacturers may produce power equipment, and be provided with receptacle 1010 which may be installed in the power equipment and configured to deliver power to the equipment from one or more battery assemblies 100. Receptacle 1010 may be configured to be removably connected to the power equipment in an orientation such that battery assembly 100 is inserted either horizontally into receptacle 1010 or vertically into receptacle 1010, or at any other orientation (e.g., an orientation between horizontal and vertical), according to some embodiments. In some embodiments, as shown in FIG. 36, multiple battery assemblies 100 and receptacles 1010 may be used. For example, if a specific power equipment requires a higher voltage or a higher energy capacity of battery assembly 100, multiple receptacles 1010 may be removably connected to the specific power equipment. Battery assemblies 100 may be connected to each other in series (e.g., to increase the voltage output from battery system 1084) or in parallel (e.g., to increase the energy capacity of battery system 1084). If multiple receptacles 1010 and battery assemblies 100 are used on the specific power equipment, battery system 1084 may be electrically connected to the specific power equipment through electrical connection 1086, as shown in FIG. 36.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable sub combination. Moreover, although features may be described above as acting in certain combinations and even initially claimed as such, one or more features from a claimed combination can in some cases be excised from the combination, and the claimed combination may be directed to a subcombination or variation of a subcombination.

It should be understood that while the use of words such as desirable or suitable utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," or "at least one" are used there is no intention to limit the claim to only one item unless specifically stated to the contrary in the claim.

It should be noted that certain passages of this disclosure can reference terms such as "first" and "second" in connection with side and end, etc., for purposes of identifying or differentiating one from another or from others. These terms are not intended to merely relate entities (e.g., a first side and a second side) temporally or according to a sequence, although in some cases, these entities can include such a relationship. Nor do these terms limit the number of possible entities (e.g., sides or ends) that can operate within a system or environment.

The terms "connected" and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

What is claimed is:

1. A battery assembly comprising:
    a housing comprising a handle;
    a plurality of rechargeable battery cells disposed within the housing; and
    a mating feature configured to selectively connect the battery assembly with a receptacle of at least one of a power equipment and a charging station, wherein the mating feature includes:
        a connector having:
            at least two electrical ports electrically connected to the plurality of battery cells; and
            a data port configured to provide data communication between the battery assembly and at least one of a power equipment and a charging station; and
    a controller comprising a processing circuit, the processing circuit comprising:
        a battery control module configured to enable or disable the plurality of rechargeable battery cells from providing power through the at least two electrical ports;
        a timer module that is configured to determine a remaining rental time of the battery assembly and send a command signal to the battery control module to disable the plurality of rechargeable battery cells when the remaining rental time is zero;
    wherein the mating feature protrudes away from a side portion of the housing.

2. The battery assembly of claim 1, wherein the battery assembly weighs thirty pounds or less and provides at least five kilowatts of power at a constant current output.

3. The battery assembly of claim 2, wherein the battery assembly is removable and portable by hand by a single person.

4. The battery assembly of claim 1,
    wherein the controller is configured to monitor a status of the battery assembly and control an operation of the battery assembly and is further configured to communicate information via the data port, and wherein the information communicated is at least one of information regarding the status of the battery assembly and a command.

5. The battery assembly of claim 4, wherein the controller is further configured to wirelessly communicate information with at least one of a remote server and a personal computer, wherein the information communicated with the at least one of the remote server and the personal computer is the at least one of information regarding the status of the battery assembly and the command.

6. The battery assembly of claim 5, wherein the controller further comprises:
    a wireless transceiver configured to communicably connect the controller with at least one of a remote server and a personal computer device; and
    the processing circuit, comprising:
        the battery control module;
        a battery monitor module;
        a battery cycle module;
        wherein the battery control module is configured to electrically connect or disconnect the plurality of ports with the plurality of battery cells and is configured to control an amount of power output from the plurality of battery cells to the plurality of ports;
        wherein the battery monitor module is configured to monitor at least one of a state of charge of the plurality of battery cells and a state of health of the plurality of battery cells; and
        wherein the battery cycle module is configured to record a number of charges and discharges of the plurality of battery cells.

7. The battery assembly of claim 1, wherein the battery monitor module is configured to communicate with a user interface to display a state of charge of the plurality of battery cells.

8. The battery assembly of claim 7, wherein the battery cycle module is configured to communicate with the battery monitor module via the processing circuit to determine a charge or discharge of the plurality of battery cells.

9. The battery assembly of claim 8, wherein each of the battery control module, the battery monitor module, the timer module, and the battery cycle module are configured to communicably connect to at least one of the remote server and the personal computer device to communicate information regarding at least one of:
    the state of charge of the plurality of battery cells;
    the state of health of the plurality of battery cells;
    the remaining rental time of the battery assembly; and
    the number of charges and discharges of the plurality of battery cells.

10. The battery assembly of claim 8, wherein the controller is configured to receive from at least one of the remote server and the personal computer device at least one of a command to increase the remaining rental time and a command to electrically disconnect the plurality of battery cells from the plurality of ports, via the wireless transceiver.

11. The battery assembly of claim 1, wherein the data port is located between two of the at least two electrical ports.

12. The battery assembly of claim 1, wherein the timer module is configured to increase the remaining rental time in response to receiving an indication that additional time has been requested.

13. The battery assembly of claim 12, wherein the timer module is configured to communicate with the battery control module via the processing circuit to enable the plurality of battery cells to provide power through the plurality of ports for the duration of the increased amount of time remaining in the rental period.

\* \* \* \* \*